US012731545B2

(12) United States Patent
Gai et al.

(10) Patent No.: US 12,731,545 B2
(45) Date of Patent: Sep. 8, 2026

(54) PIXEL CIRCUIT AND DRIVING METHOD THEREFOR, AND DISPLAY PANEL

(71) Applicant: Yungu (Gu'an) Technology Co., Ltd., Langfang (CN)

(72) Inventors: Cuili Gai, Langfang (CN); Enqing Guo, Langfang (CN); Junfeng Li, Langfang (CN); Rubo Xing, Hefei (CN); Kangguan Pan, Hefei (CN)

(73) Assignee: Yungu (Gu'an) Technology Co., Ltd., Langfang (CN)

( * ) Notice: Subject to any disclaimer, the term of this patent is extended or adjusted under 35 U.S.C. 154(b) by 0 days.

(21) Appl. No.: 19/059,272

(22) Filed: Feb. 21, 2025

(65) Prior Publication Data

US 2025/0232727 A1 Jul. 17, 2025

Related U.S. Application Data

(63) Continuation of application No. PCT/CN2023/073675, filed on Jan. 29, 2023.

(30) Foreign Application Priority Data

Aug. 30, 2022 (CN) ........................ 202211049980.5

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01);
(Continued)

(58) Field of Classification Search
None
See application file for complete search history.

(56) References Cited

U.S. PATENT DOCUMENTS 11,011,113 B1 5/2021 Lu et al.
2016/0171928 A1* 6/2016 Gai .................... G09G 3/3225 345/78

(Continued)

FOREIGN PATENT DOCUMENTS

CN 107369412 A 11/2017
CN 105741779 B 3/2018

(Continued)

OTHER PUBLICATIONS

First Office Action of Chinese Application No. CN 202211049980.5.

(Continued)

*Primary Examiner* — Dorothy Harris
(74) *Attorney, Agent, or Firm* — Kilpatrick Townsend & Stockton LLP

(57) ABSTRACT

A pixel circuit and a driving method therefor, and a display panel are disclosed. The pixel circuit includes a drive module, a data writing module, and a light-emitting module. The data writing module includes a first transistor (T1) and a second transistor (T2) that are connected in series. The first transistor (T1) is a low-temperature polysilicon transistor, and the second transistor (T2) is an oxide transistor. The data writing module is configured to transmit a data voltage (Vdata) to the drive module. The drive module is configured to drive, based on the data voltage (Vdata), the light-emitting module to emit light.

6 Claims, 7 Drawing Sheets

(52) U.S. Cl.
CPC . *G09G 2300/0861* (2013.01); *G09G 2310/08* (2013.01); *G09G 2320/0233* (2013.01); *G09G 2330/021* (2013.01)

(56) References Cited

U.S. PATENT DOCUMENTS

| | | | | |
|---|---|---|---|---|
| 2018/0233082 | A1 | 8/2018 | Wang et al. | |
| 2018/0357964 | A1* | 12/2018 | Shin | G09G 3/3233 |
| 2021/0166623 | A1* | 6/2021 | Gai | G09G 3/3233 |
| 2021/0327348 | A1 | 10/2021 | Dong et al. | |
| 2022/0114972 | A1* | 4/2022 | Zhang | G09G 3/3266 |
| 2022/0157223 | A1* | 5/2022 | Wang | G09G 3/32 |
| 2022/0157239 | A1* | 5/2022 | Zhang | G09G 3/3233 |
| 2022/0415273 | A1 | 12/2022 | Chen et al. | |
| 2023/0360600 | A1* | 11/2023 | Wang | G09G 3/3291 |

FOREIGN PATENT DOCUMENTS

| | | | |
|---|---|---|---|
| CN | 111754920 | A | 10/2020 |
| CN | 112419967 | A | 2/2021 |
| CN | 113140179 | A | 7/2021 |
| CN | 113421525 | A | 9/2021 |
| CN | 113658554 | A | 11/2021 |
| CN | 112071268 | B | 2/2022 |
| CN | 115294940 | A | 11/2022 |

OTHER PUBLICATIONS

International Search Report of Application No. PCT/CN2023/073675.

* cited by examiner

PIXEL CIRCUIT AND DRIVING METHOD THEREFOR, AND DISPLAY PANEL

CROSS-REFERENCE TO RELATED APPLICATIONS

The present application is a continuation of International Application No. PCT/CN2023/073675 filed on Jan. 29, 2023, which claims priority to Chinese Patent Application No. 202211049980.5 filed on Aug. 30, 2022. All of the aforementioned patent applications are hereby incorporated by reference in their entireties.

FIELD

Embodiments of the present application relate to display technologies, for example, to a pixel circuit and a driving method therefor, and a display panel.

BACKGROUND OF THE DISCLOSURE

An active-matrix organic light-emitting diode (AMOLED) display panel has advantages of a small size, a simple structure, autonomous light emission, high brightness, good picture quality, a large angle of visibility, low power consumption, a high response speed, etc., and therefore becomes a research hotspot in the current field.

However, a current medium-sized AMOLED display panel cannot implement broadband driving.

SUMMARY OF THE DISCLOSURE

The present application provides a pixel circuit and a driving method therefor, and a display panel, to implement broadband driving of the pixel circuit.

According to one embodiment of the present application provides a pixel circuit, including: a drive module, a data writing module, and a light-emitting module, where the data writing module includes a first transistor and a second transistor that are connected in series, the first transistor is a low-temperature polysilicon transistor, the second transistor is an oxide transistor, and the data writing module is configured to transmit a data voltage to the drive module; and the drive module is configured to drive, based on the data voltage, the light-emitting module to emit light.

According to one embodiment of the present application further provides a driving method for a pixel circuit. The pixel circuit includes a drive module, a data writing module, and a light-emitting module. The data writing module includes a first transistor and a second transistor that are connected in series, the first transistor is a low-temperature polysilicon transistor, and the second transistor is an oxide transistor.

The driving method includes:

at a data writing stage, controlling the first transistor and the second transistor to be turned on, where the second transistor is turned on prior to the first transistor, to transmit a data voltage provided by a data line to the drive module;

at a light emitting stage, controlling the first transistor and the second transistor to be turned off; and driving, by the drive module based on the data voltage, the light-emitting module to emit light.

According to one embodiment of the present application further provides a display panel, including the pixel circuit provided in any embodiment of the present application.

The pixel circuit provided in the embodiments of the present application includes the drive module, the data writing module, and the light-emitting module. The data writing module includes the first transistor and the second transistor that are connected in series. The first transistor is a low-temperature polysilicon transistor, and the second transistor is an oxide transistor. The data writing module is configured to transmit the data voltage to the drive module. The drive module is configured to drive, based on the data voltage, the light-emitting module to emit light.

DETAILED DESCRIPTION OF THE DISCLOSURE

The present application is described in detail below with reference to the accompanying drawings and embodiments.

A pixel circuit in the related art cannot meet the requirements of broadband driving. The reason for the above problem is that if a display panel is driven by a low-temperature polysilicon (LTPS) pixel circuit, because a leakage current of the low-temperature polysilicon transistor is large, and if a transistor connected to a drive transistor is in an off state for a long time, a leakage time thereof is long, resulting in an unstable gate voltage of the drive transistor, and grossly uneven display brightness. If an all-oxide circuit is selected for driving, transistors in the pixel circuit are all oxide transistors. Because the oxide transistor has a low mobility, a data voltage cannot be fully written at a high refresh frequency, affecting a display effect.

Figure 1:
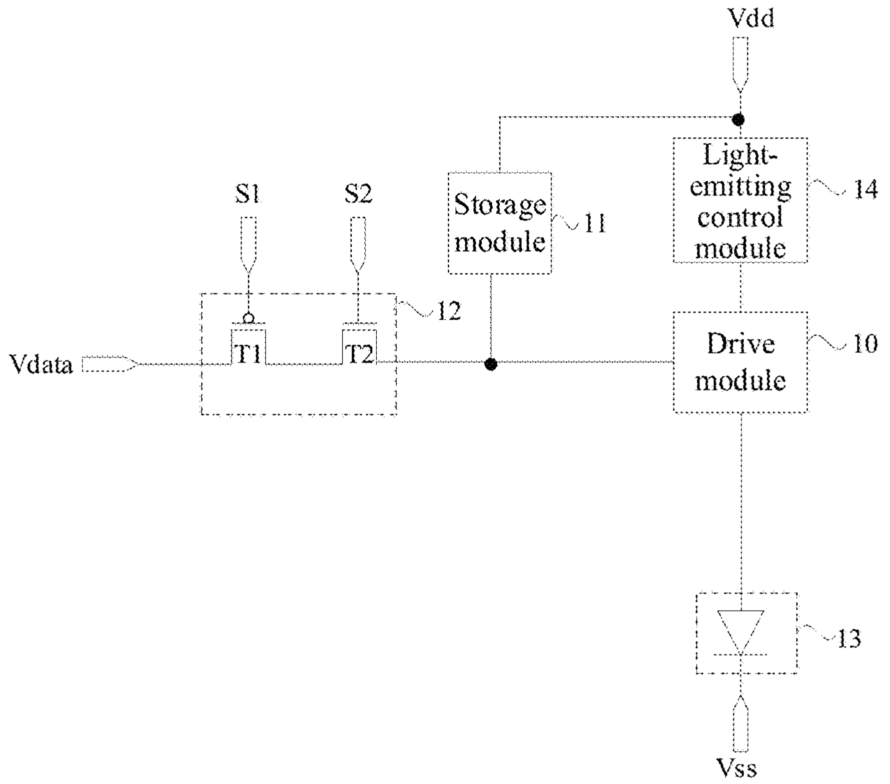
FIG. 1 is a schematic diagram of a structure of a pixel circuit according to an embodiment of the present application.

An embodiment of the present application provides a new pixel circuit structure to implement broadband display. FIG. 1 is a schematic diagram of a structure of a pixel circuit according to an embodiment of the present application. Referring to FIG. 1, the pixel circuit provided in this embodiment of the present application includes a drive module 10, a data writing module 12, and a light-emitting module 13.

The data writing module 12 includes a first transistor T1 and a second transistor T2 that are connected in series, the first transistor T1 is a low-temperature polysilicon transistor, the second transistor T2 is an oxide transistor, and the data writing module 12 is configured to transmit a data voltage to the drive module 10.

The drive module 11 is configured to drive, based on the data voltage, the light-emitting module 13 to emit light.

The pixel circuit further includes a storage module 11 and at least one light-emitting control module 14. The storage module 11 is connected to the drive module 10. The storage module 11 is configured to store the data voltage. The light-emitting control module 14 is configured to control whether the drive module 10 is connected to at least one of a first power supply Vdd or a second power supply Vss. In other words, the light-emitting control module 14 is configured to control whether a path is formed among the first power supply Vdd, the light-emitting module 13, and the second power supply Vss. In this embodiment, for example, the light-emitting control module 14 and the drive module 10 are connected between the first power supply Vdd and the second power supply Vss. For example, a gate of the first transistor T1 is connected to a first scan line S1, a gate of the second transistor T2 is connected to a second scan line S2, the first transistor T1 is turned on or off in response to a signal on the first scan line S1, and the second transistor T2 is turned on or off in response to a signal on the second scan line S2.

For example, in this embodiment, a working stage of the pixel circuit during a time for displaying one frame of picture may include at least a data voltage writing stage and a light emitting stage. At the data voltage writing stage, both the first transistor T1 and the second transistor T2 are turned on to transmit the data voltage to the drive module 10. The first transistor T1 is a low-temperature polysilicon transistor with a high mobility, and can rapidly write the data voltage into the drive module, and therefore is applicable to a case in which a time for the data voltage writing stage is short at a high refresh frequency. At the light emitting stage, the first transistor T1 and the second transistor T2 are turned off, the light-emitting control module 14 is turned on, and a path is formed among the first power supply Vdd, the light-emitting control module 14, the drive module 10, the light-emitting module 13, and the second power supply Vss, and the drive module 10 generates a driving current based on the data voltage to drive the light-emitting module 13 to emit light. The second transistor T2 is an oxide transistor, for example, an indium gallium zinc oxide (IGZO) transistor, which has a small leakage current in an off state at the light emitting stage, and when a time for the light emitting stage of the pixel circuit is long at a low refresh frequency, the leakage current can be reduced, and a voltage at a control terminal of the drive module 10 is kept stable, to help improve a display effect.

The low-temperature polysilicon transistor has a high mobility and a high driving speed. The first transistor, being a low-temperature polysilicon transistor, may rapidly write the data voltage into the drive module, and is applicable to high-frequency driving. The leakage current of the oxide transistor in the off state is small. The second transistor, being an oxide transistor, may reduce the leakage current, to alleviate a problem of a poor display effect caused by a long leakage time, and ensuring display stability of a display panel. Therefore, in this embodiment, a pixel drive circuit in which a low-temperature polysilicon transistor is combined with an oxide transistor is used, to help implement broadband driving of the display panel, reducing power consumption, and helping improve the display effect.

Still referring to FIG. 1, in one embodiment, in a display period of the pixel circuit, the second transistor T2 is turned on prior to the first transistor T1, and the first transistor T1 is turned on in a period in which the second transistor T2 is turned on.

For example, the second transistor T2 may be turned on before the data voltage writing stage, the first transistor T1 and the second transistor T2 as a whole may be equivalent to a low-temperature polysilicon transistor at the data voltage writing stage, to rapidly write the data voltage into the drive module 10. Although the second transistor T2 is an oxide transistor, the second transistor T2 is completely turned on at the data voltage writing stage, without affecting rapid writing of the data voltage.

Still referring to FIG. 1, in one embodiment, the first transistor T1 and the second transistor T2 are sequentially connected in series between a data line Vdata and the drive module 10.

The first transistor T1 and the second transistor T2 are connected in series, and the first transistor T1 and the second transistor T2 as a whole are equivalent to an oxide transistor after being turned off, to reduce the leakage current. The second transistor T2 is closer to the drive module 10 than the first transistor T1, and the second transistor T2 has a stronger capability of suppressing leakage after being turned off, which helps maintain stability of the voltage at the control terminal (that is, a terminal connected to the second transistor T2) of the drive module 10. In addition, the second transistor T2 is also connected in series to the first transistor T1, and the first transistor T1 may further suppress leakage after being turned off, to improve stability of the voltage at the control terminal of the drive module 10 and improving display uniformity.

Figure 2:
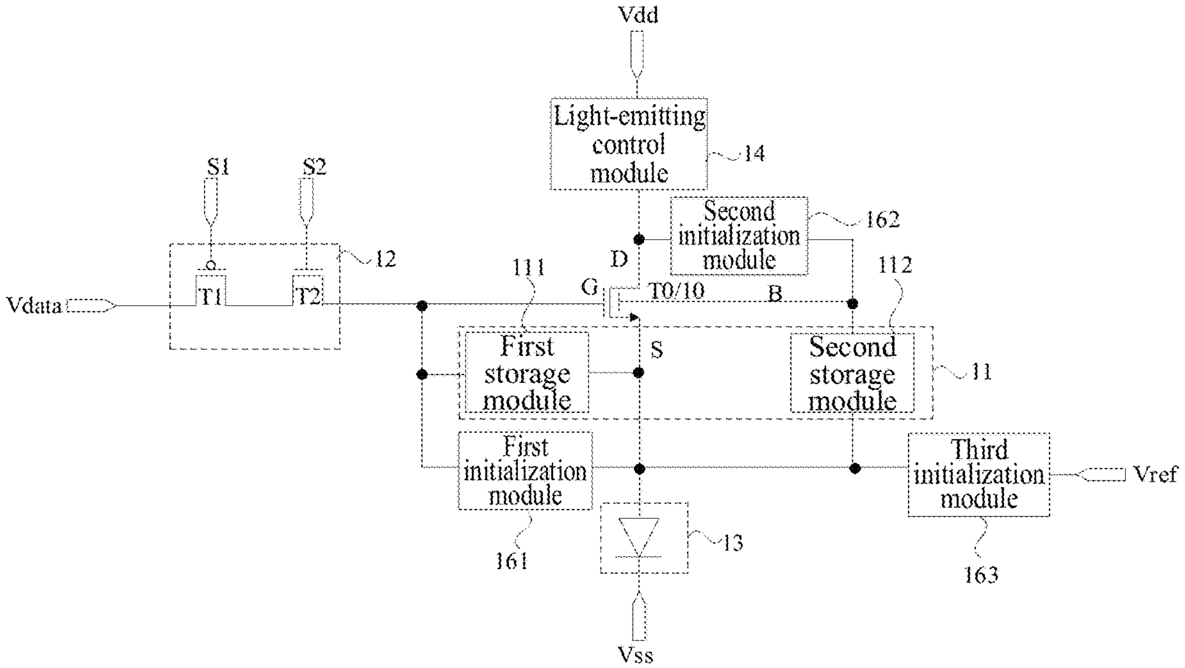
FIG. 2 is a schematic diagram of a structure of another pixel circuit according to an embodiment of the present application.

FIG. 2 is a schematic diagram of a structure of another pixel circuit according to an embodiment of the present application. Referring to FIG. 2, in one embodiment, the pixel circuit further includes a storage module 11, a light-emitting control module 14, and an initialization module. The storage module 11 is connected to the drive module 10 and is configured to store the data voltage. The storage module 11 includes a first storage module 111 and a second storage module 112. The drive module 10 includes a dual-gate transistor T0. The light-emitting control module 14, the dual-gate transistor T0, and the light-emitting module 13 are sequentially connected between a first power supply Vdd and a second power supply Vss. A first electrode D of the dual-gate transistor T0 is connected to the light-emitting control module 14, and a second electrode S of the dual-gate transistor T0 is connected to the light-emitting module 13.

The data writing module 12 is connected between a first gate G of the dual-gate transistor T0 and the data line Vdata, and the data writing module 12 is configured to transmit a data voltage output by the data line Vdata to the first gate G.

The first storage module 111 is connected between the first gate G and the second electrode S of the dual-gate transistor T0, the first storage module 111 is configured to store a voltage at the first gate G, the second storage module 112 is connected between a second gate B and the second electrode S of the dual-gate transistor T0, and the second storage module 112 is configured to store a voltage at the second gate B.

The initialization module is configured to initialize the first gate G, the second gate B, the first electrode D, and the second electrode S of the dual-gate transistor T0.

The dual-gate transistor T0 serves as the drive module 10 of the pixel circuit to drive the light-emitting module 13 to emit light. The dual-gate transistor T0 is generally a vertical dual-gate transistor, the first gate G may be a top gate, and the second gate B may be a bottom gate. A threshold voltage of the dual-gate transistor T0 may be adjusted by setting a voltage between the second gate B and the second electrode S of the dual-gate transistor T0.

The initialization module may include multiple transistors, for example, a transistor connected to the second gate B, to initialize the second gate B, may further include a transistor connected to the first electrode D of the dual-gate transistor T0, to initialize the first electrode D, and may further include transistors connected to the first gate G and the second electrode S of the dual-gate transistor T0, to initialize the first gate G and the second electrode S.

Still referring to FIG. 2, in one embodiment, the initialization module includes a first initialization module 161, a second initialization module 162, and a third initialization module 163. The first initialization module 161 is connected between the first gate G and the second electrode S of the dual-gate transistor T0, and the second initialization module 162 is connected between the second gate B and the first electrode D of the dual-gate transistor T0.

The third initialization module 163 is connected between the second electrode S of the dual-gate transistor T0 and an initialization signal line Vref.

In this embodiment, a working process of the pixel circuit may include an initialization stage, a compensation stage, a data voltage writing stage, and a light emitting stage. The first initialization module 161, the second initialization module 162, and the third initialization module 163 are respectively connected to different scan lines, and are turned on or off in response to signals on the scan lines respectively connected thereto. The light-emitting control module 14 is connected to a light-emitting control signal line, and is turned on or off in response to a signal on the light-emitting control signal line. The first transistor T1 is turned on or off in response to a signal on a first scan line S1, and the second transistor T2 is turned on or off in response to a signal on a second scan line S2. The first initialization module 161 is used as an example. The first initialization module 161 being turned on means that the second electrode S and the first gate G of the dual-gate transistor T0 are connected, and the first initialization module 161 being turned off means that the second electrode S and the first gate G of the dual-gate transistor T0 are disconnected. For example, at the initialization stage, the first initialization module 161, the second initialization module 162, the third initialization module 163, the light-emitting control module 14, and the second transistor T2 are controlled to be turned on, and the first transistor T1 is controlled to be turned off. An initialization voltage on the initialization signal line Vref is transmitted to the second electrode S of the dual-gate transistor T0 via the third initialization module 163 that is turned on, and is then transmitted to the first gate G of the dual-gate transistor T0 via the first initialization module 161, to initialize the first gate G, the second electrode S, and a first terminal of the light-emitting module 13. A first power voltage V1 provided by the first power supply Vdd is transmitted to the first electrode D of the dual-gate transistor T0 via the light-emitting control module 14 that is turned on, and is then transmitted to the second gate B of the dual-gate transistor T0 via the second initialization module 162 that is turned on, to initialize the first electrode D and the second gate B of the dual-gate transistor T0. At the initialization stage, the second transistor T2 is turned on in advance, and the first transistor T1 and the second transistor T2 as a whole may be equivalent to a low-temperature polysilicon transistor after being turned on at a subsequent stage, to rapidly write the data voltage into the drive module 10. Although the second transistor T2 is an oxide transistor, the second transistor T2 is completely turned on at the subsequent data voltage writing stage, without affecting rapid writing of the data voltage. It should be noted that, at the initialization stage, the voltage at the second gate B is the first power voltage V1. The first supply power V1 is at a high level, and a threshold voltage Vth of the dual-gate transistor T0 is less than 0. In this case, a voltage difference between the first gate G and the second electrode S of the dual-gate transistor T0 is greater than the threshold voltage Vth, and the dual-gate transistor T0 is turned on.

At the compensation stage, the first transistor T1 and the light-emitting control module 14 are controlled to be turned off, and the first initialization module 161, the second initialization module 162, the third initialization module 163, the dual-gate transistor T0, and the second transistor T2 are controlled to be turned on. Because the voltage at the second gate B is the first power voltage V1, and the first power voltage V1 is higher than the initialization voltage Vf on the initialization signal line Vref, a path is formed among the second gate B, the second initialization module 162, the dual-gate transistor T0, the third initialization module 163, and the initialization signal line Vref, a charge of the second gate B flows to the second electrode S, and a voltage between the second gate B and the first electrode D decreases. As the voltage at the second gate B decreases, the threshold voltage Vth of the dual-gate transistor T0 gradually positively shifts. When the threshold voltage Vth increases to 0 V, the voltage difference between the first gate G and the second electrode S of the dual-gate transistor T0 is VGS=Vth=0, the dual-gate transistor T0 is turned off, and the second storage module 112 stores the voltage difference VBS between the second gate B and the second electrode S of the dual-gate transistor T0.

At the data voltage writing stage, the first transistor T1, the second transistor T2, and the third initialization module 163 are controlled to be turned on, the first initialization module 161, the second initialization module 162, and the light-emitting control module 14 are controlled to be turned off, the data voltage Vd provided by the data line Vdata is transmitted to the first gate G of the dual-gate transistor T0 via the first transistor T1 and the second transistor T2 that are turned on, the voltage at the first gate G is VG=Vd, and a voltage at the second electrode S of the dual-gate transistor T0 is VS=Vf. In this case, the voltage difference VBS between the second gate B and the second electrode S of the dual-gate transistor T0 remains unchanged, and the threshold voltage Vth of the dual-gate transistor T0 remains unchanged. The first transistor T1 is a low-temperature polysilicon transistor with a high mobility, and can rapidly write the data voltage into the first gate of the dual-gate transistor T0 at the data voltage writing stage, to facilitate high-frequency driving.

At the light emitting stage, the light-emitting control module 14 is controlled to be turned on, and the first transistor T1, the second transistor T2, the first initialization module 161, the second initialization module 162, and the third initialization module 163 are controlled to be turned off, and the dual-gate transistor T0 generates a driving current based on the data voltage Vd to drive the light-emitting module 13 to emit light. At the light emitting stage, the second transistor T2 is in an off state, and the second transistor T2 is an oxide transistor with a small leakage current in the off state. Therefore, when the light emitting stage is long, the second transistor T2 may improve stability of a potential of the first gate G, to improve display uniformity, and reducing power consumption.

In one embodiment, a signal on the initialization signal line is provided by the second power supply.

The signal on the initialization signal line may be either the initialization voltage or a second power voltage provided by the second power supply. Providing the signal on the initialization signal line by the second power supply may reduce a quantity of signal lines, to simplify a structural design of a driving IC.

Figure 3:
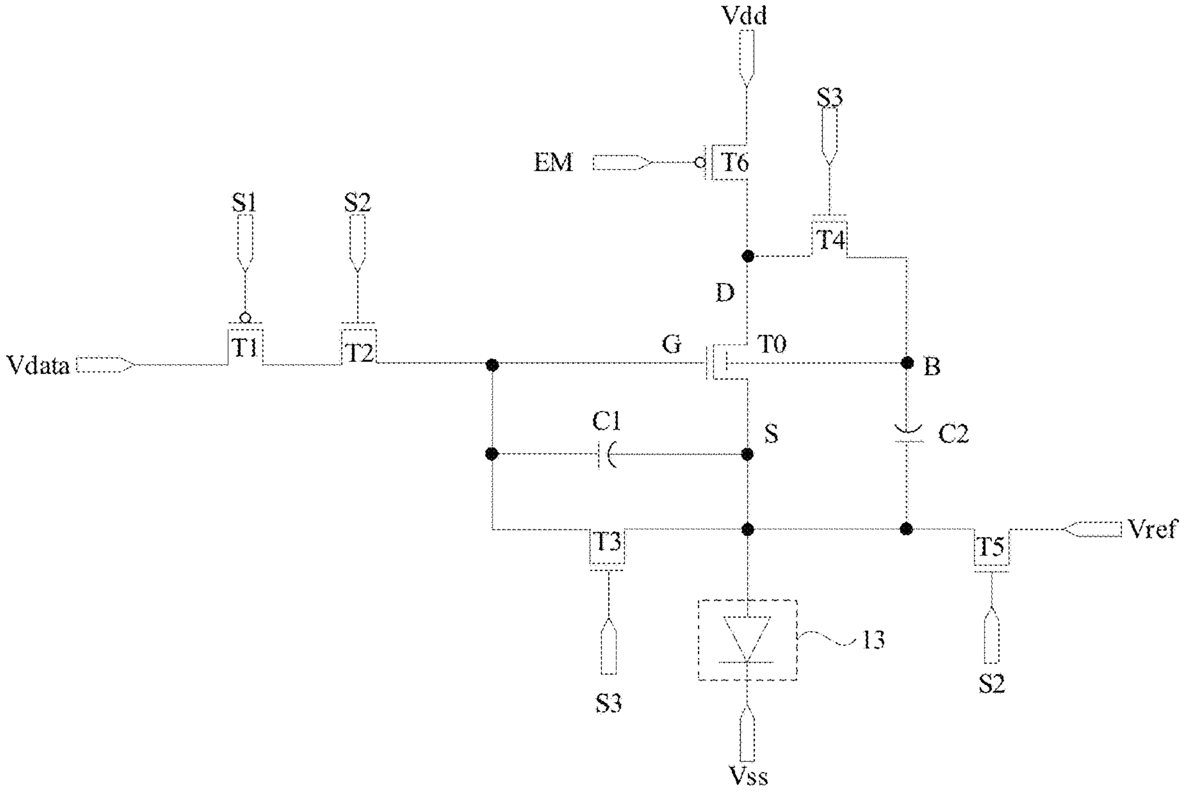
FIG. 3 is a schematic diagram of a structure of another pixel circuit according to an embodiment of the present application.

FIG. 3 is a schematic diagram of a structure of another pixel circuit according to an embodiment of the present application. Referring to FIGS. 2 and 3, in one embodiment, the first gate G is a top gate, and the second gate B is a bottom gate. The first initialization module 161 includes a third transistor T3, the second initialization module 162 includes a fourth transistor T4, the third initialization module 163 includes a fifth transistor T5, and the light-emitting control module 14 includes a sixth transistor T6. The first storage module 111 includes a first capacitor C1, and the second storage module 112 includes a second capacitor C2.

A first electrode of the first transistor T1 is connected to the data line Vdata, a second electrode of the first transistor T1 is connected to a first electrode of the second transistor T2, a gate of the first transistor T1 is connected to a first scan line S1, a second electrode of the second transistor T2 is connected to the first gate G of the dual-gate transistor T0, and a gate of the second transistor T2 is connected to a second scan line S2.

A first electrode of the third transistor T3 is connected to the second electrode S of the dual-gate transistor T0, a second electrode of the third transistor T3 is connected to the first gate G of the dual-gate transistor T0, a gate of the third transistor T3 is connected to a third scan line S3, a first electrode of the fourth transistor T4 is connected to the first electrode D of the dual-gate transistor T0, a second electrode of the fourth transistor T4 is connected to the second gate B of the dual-gate transistor T0, and a gate of the fourth transistor T4 is connected to the third scan line S3.

A first electrode of the fifth transistor T5 is connected to the initialization signal line Vref, a second electrode of the fifth transistor T5 is connected to the second electrode S of the dual-gate transistor T0, and a gate of the fifth transistor T5 is connected to the second scan line S2.

A first electrode of the sixth transistor T6 is connected to the first power supply Vdd, a second electrode of the sixth transistor T6 is connected to the first electrode D of the dual-gate transistor T0, and a gate of the sixth transistor T6 is connected to a light-emitting control signal line EM.

The first capacitor C1 is connected between the first gate G and the second electrode S of the dual-gate transistor T0, and the second capacitor C2 is connected between the second gate B and the second electrode S of the dual-gate transistor T0.

Still referring to FIG. 3, in one embodiment, the sixth transistor T6 is a low-temperature polysilicon transistor, and the dual-gate transistor T0, the third transistor T3, the fourth transistor T4, and the fifth transistor T5 are all oxide transistors.

Figure 4:
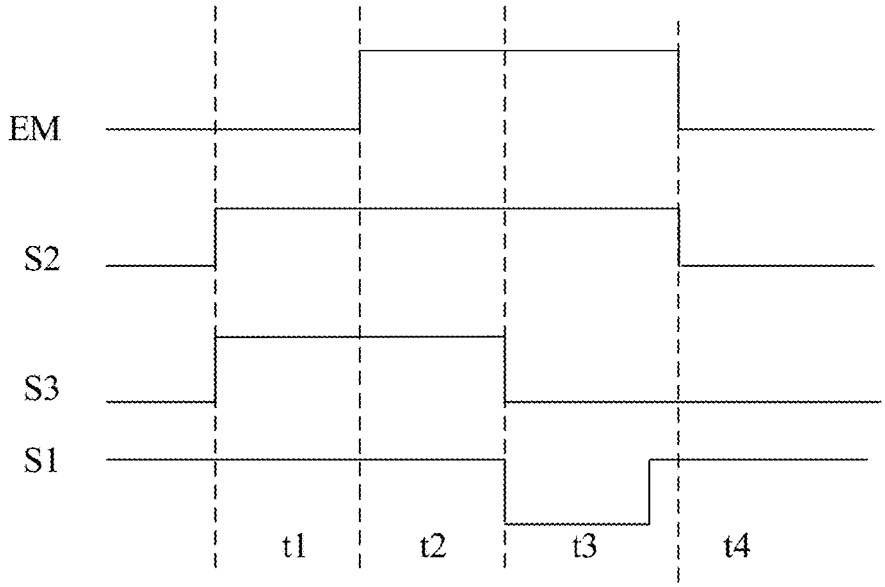
FIG. 4 is a diagram showing driving timing of a pixel circuit according to an embodiment of the present application.

FIG. 4 is a diagram showing driving timing of a pixel circuit according to an embodiment of the present application. The driving timing diagram shown in FIG. 4 is applicable to the pixel circuit shown in FIG. 3. In this embodiment, for example, the first transistor T1 and the sixth transistor T6 are P-type transistors, and the dual-gate transistor T0, the second transistor T2, the third transistor T3, the fourth transistor T4, and the fifth transistor T5 are all N-type transistors.

In one embodiment, the working process of the pixel circuit may include an initialization stage t1, a compensation stage t2, a data voltage writing stage t3, and a light emitting stage t4. For example, at the initialization stage t1, the signal on the second scan line S2 is at a high level, and the second transistor T2 and the fifth transistor T5 are controlled to be turned on. A signal on the third scan line S3 is at a high level, and the third transistor T3 and the fourth transistor T4 are controlled to be turned on. A signal on the light-emitting control signal line EM is at a low level, and the sixth transistor T6 is controlled to be turned on. The signal on the first scan line S1 is at a high level, and the first transistor T1 is controlled to be turned off. The fifth transistor T5 and the third transistor T3 that are turned on transmit the initialization voltage Vf on the initialization signal line Vref to the first terminal of the light-emitting module 13 and to the first gate G of the dual-gate transistor T0, to initialize the first gate G, the second electrode S, and the first terminal of the light-emitting module 13. The sixth transistor T6 and the fourth transistor T4 that are turned on transmit the first power voltage V1 provided by the first power supply Vdd to the first electrode D and the second gate B of the dual-gate transistor T0, to initialize the second gate B and the first electrode D. The second transistor T2 is turned on in advance at the initialization stage t1. Although the second transistor T2 is an oxide transistor, the second transistor T2 is completely turned on at the subsequent data voltage writing stage t3, and the data voltage Vd can be rapidly written into the first gate G of the dual-gate transistor T0 via the first transistor T1.

At the compensation stage t2, the second scan signal S2 is at a high level, and the second transistor T2 and the fifth transistor T5 are controlled to be turned on. The signal on the third scan line S3 is at a high level, and the third transistor T3 and the fourth transistor T4 are controlled to be turned on. The signal on the light-emitting control signal line EM is at a high level, and the sixth transistor T6 is controlled to be turned off. The signal on the first scan line S1 is at a high level, and the first transistor T1 is controlled to be turned off. After the sixth transistor T6 is turned off, the second capacitor C2 stores the first power voltage V1 at a first terminal of the second capacitor C2. A path is formed among the second gate B, the fourth transistor T4, the dual-gate transistor T0, the fifth transistor T5, and the initialization signal line Vref. The voltage between the first electrode D and the second gate B of the dual-gate transistor T0 decreases. As the voltage at the second gate B decreases, the threshold voltage Vth of the dual-gate transistor T0 gradually positively shifts. When the threshold voltage Vth is equal to 0 V, the voltage difference between the first gate G and the second electrode S of the dual-gate transistor T0 is VGS=Vth=0, the dual-gate transistor T0 is turned off, and the second capacitor C2 stores the voltage difference VBS between the second gate B and the second electrode of the dual-gate transistor T0.

At the data voltage writing stage t3, the second scan signal S2 is at a high level, and the second transistor T2 and the fifth transistor T5 are controlled to be turned on. The signal on the third scan line S3 is at a low level, and the third transistor T3 and the fourth transistor T4 are controlled to be turned off. The signal on the light-emitting control signal line EM is at a high level, and the sixth transistor T6 is controlled to be turned off. The signal on the first scan line S1 is at a low level, and the first transistor T1 is controlled to be turned on. The first transistor T1 and the second transistor T2 that are turned on transmit the data voltage Vd to the first gate G, and the fifth transistor T5 that is turned on transmits the initialization voltage Vref to the second electrode S of the dual-gate transistor T0. The first transistor T1 is a low-temperature polysilicon transistor with a high mobility, and can rapidly write the data voltage Vd into the dual-gate transistor T0. When a time for the data voltage writing stage t3 is short at a high refresh frequency, the data voltage Vd can still be fully written into the dual-gate transistor T0, to help implement high-frequency driving.

At the light emitting stage t4, the second scan signal S2 is at a low level, and the second transistor T2 and the fifth transistor T5 are controlled to be turned off. The signal on the third scan line S3 is at a low level, the third transistor T3 and the fourth transistor T4 are controlled to be turned off. The signal on the first scan line S1 is at a high level, and the first transistor T1 is controlled to be turned off. The signal on the light-emitting control signal line EM is at a low level, the sixth transistor T6 is controlled to be turned on, and the dual-gate transistor T0 generates the driving current based on a voltage between the first gate G and the second electrode S thereof, to drive the light-emitting module 13 to emit light. After the light-emitting module 13 is turned on, the voltage at the second electrode S of the dual-gate transistor T0 is VS=V2+Voled, where Voled is a cross voltage of the light-emitting module 13, and V2 is the second power voltage provided by the second power supply Vss. At the light emitting stage t4, a voltage boost amount of the second electrode S is $\Delta 1$=V2+Voled−Vf. The first gate G is also boosted by $\Delta 1$ because of a coupling effect of the first capacitor C1. In this case, the voltage at the first gate G is VG=Vd+$\Delta 1$=Vd+V2+Voled−Vf. Although the voltage at the second gate B is also boosted because of a coupling effect of the second capacitor C2, the voltage difference VBS between the second gate B and the second electrode S remains unchanged, and the threshold voltage Vth=0 of the dual-gate transistor T0 remains unchanged.

At the light emitting stage, the driving current of the dual-gate transistor T0 is $I=K*(VGS-Vth)^2=K[(Vd+V2+Voled-Vf)-(V2+Voled)]^2=K*(Vd-Vf)^2$, where $K=\frac{1}{2}*\mu*Cox*W/L$, $\mu$ is a mobility of the dual-gate transistor T0, Cox is a gate insulator capacitance, and W/L is a width-to-length ratio of the dual-gate transistor T0. It can be learned from the above equation that the final driving current is not related to the threshold voltage Vth of the dual-gate transistor T0, the second power voltage V2, and the cross voltage of the light-emitting module 13, and thus the pixel circuit provided in this embodiment can compensate for problems of an uneven threshold voltage of the dual-gate transistor T0 and an IR drop of the second power voltage V2, and a problem that light emission is not uniform because cross voltages Voled of different light-emitting modules 13 are different due to aging of the light-emitting modules 13, to help improve the display effect.

For example, the second transistor T2, the third transistor T3, the fourth transistor T4, and the fifth transistor T5 that are connected to the dual-gate transistor T0 are all oxide transistors. A leakage current of the oxide transistor in an off state is small, to ensure stability of a potential of the first gate G, and helping improve the display effect. In addition, the first transistor T1 is a low-temperature polysilicon transistor, which can rapidly write the data voltage into the dual-gate transistor T0 at a high frequency, to help implement high-frequency driving. That is, the pixel circuit provided in this embodiment can implement broadband driving. The dual-gate transistor T0 is an oxide transistor with good long-range uniformity, and is suitable for medium to large-sized display with high brightness uniformity. The sixth transistor T6 is a low-temperature polysilicon transistor with good stability under negative bias temperature stress (NBTS), and has a small cross voltage, to help reduce power consumption.

Figure 5:
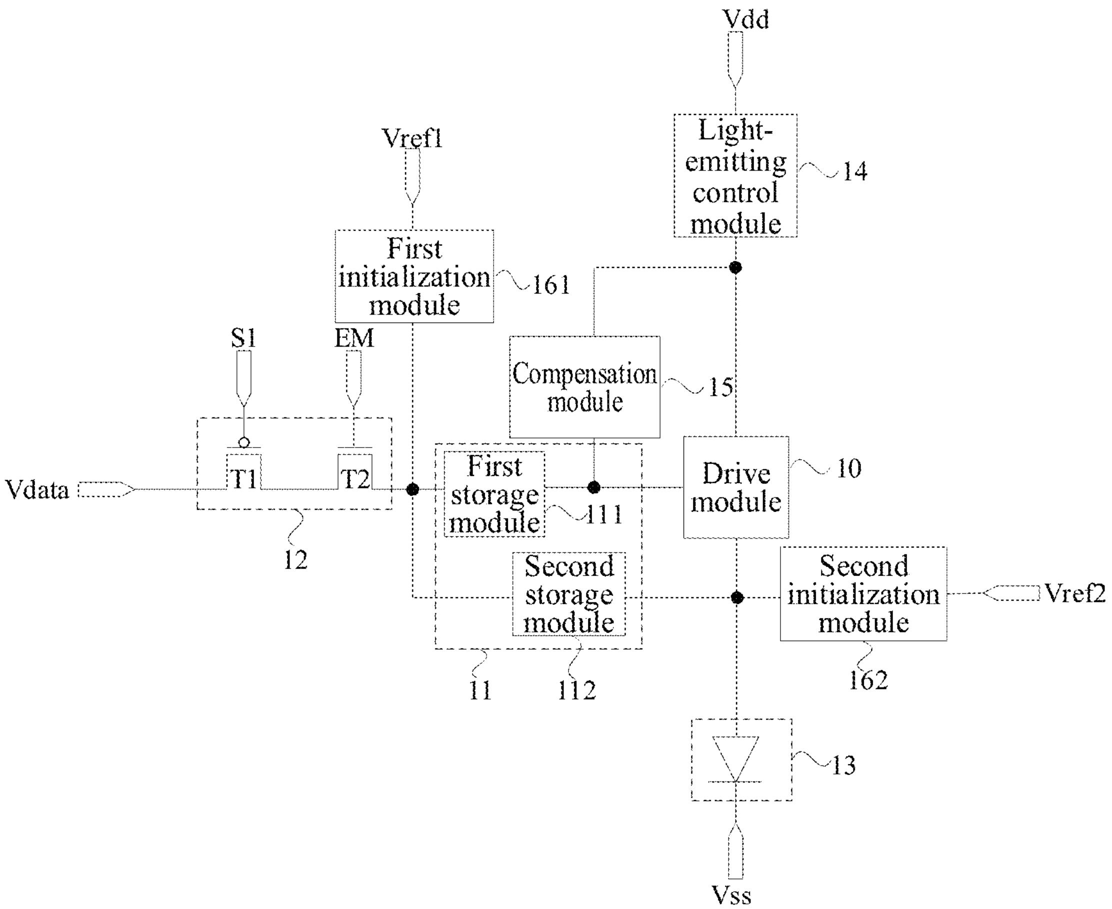
FIG. 5 is a schematic diagram of a structure of another pixel circuit according to an embodiment of the present application.

FIG. 5 is a schematic diagram of a structure of another pixel circuit according to an embodiment of the present application. Referring to FIG. 5, in one embodiment, the pixel circuit further includes a storage module 11, a light-emitting control module 14, a compensation module 15, and an initialization module. The storage module 11 includes a first storage module 111 and a second storage module 112. The light-emitting control module 14, the drive module 10, and the light-emitting module 13 are sequentially connected between a first power supply Vdd and a second power supply Vss.

The first storage module 111 is connected between the data writing module 12 and a control terminal of the drive module 10. The first storage module 111 is configured to couple the data voltage to the drive module 10.

The compensation module 15 is connected between the control terminal and a first terminal of the drive module 10, and the first terminal of the drive module 10 is connected to the light-emitting control module 14.

The second storage module 112 is connected between the data writing module 12 and a second terminal of the drive module 10 or the second storage module 112 is connected between the first storage module 111 and a second terminal of the drive module 10, and the second storage module 112 is configured to couple a voltage at the second terminal of the drive module 10 to the first storage module 111.

The initialization module is configured to initialize the first storage module 111 and the second storage module 112.

The initialization module may include multiple transistors. At least one of the transistors is connected to the first storage module 111, and is configured to initialize the first storage module 111. At least one of the transistors is connected to the second storage module 112, and is configured to initialize the second storage module 112.

Still referring to FIG. 5, in one embodiment, the initialization module includes a first initialization module 161 and a second initialization module 162. The first initialization module 161 is connected between a first initialization signal line Vref1 and a first terminal of the first storage module 111, and a second terminal of the first storage module 111 is connected to the control terminal of the drive module 10.

The second initialization module 162 is connected between a second initialization signal line Vref2 and the second terminal of the drive module 10.

After the first initialization module 161 is turned on, a first initialization voltage Vf1 provided by the first initialization signal line Vref1 is transmitted to the first terminal of the first storage module 111 to initialize the first storage module 111. After the second initialization module 162 is turned on, a second initialization voltage Vf2 provided by the second initialization signal line Vref2 is transmitted to the second terminal of the second storage module 112 to initialize the second storage module 112.

For example, a gate of the first transistor T1 is connected to a first scan line S1, and a gate of the second transistor T2 may be connected to a light-emitting control signal line EM. The pixel circuit may include an initialization stage, a compensation stage, a data voltage writing stage, and a light emitting stage. At the initialization stage, the compensation module 15, the first initialization module 161, and the light-emitting control module 14 are controlled to be turned on, the first transistor T1, the second transistor T2, and the second initialization module 162 are controlled to be turned off, a first power voltage V1 provided by the first power supply Vdd is transmitted to the first terminal of the drive module 10 via the light-emitting control module 14, and then transmitted to the control terminal of the drive module 10 via the compensation module 15 that is turned on, to initialize the control terminal and the first terminal.

At the compensation stage, the light-emitting control module 14 and the first transistor T1 are controlled to be turned off, the first initialization module 161, the second transistor T2, the compensation module 15, and the second initialization module 162 are controlled to be turned on, and the first terminal of the drive module 10 (including a drive transistor) charges the second terminal of the drive module 10, and a voltage between the first terminal and the control terminal of the drive module 10 decreases until the voltage between the first terminal and the control terminal of the drive module 10 decreases to Vf2+Vth, and the drive module 10 is turned off, where Vth is a threshold voltage of the drive transistor included in the drive module 10. The first transistor T1 and the second transistor T2 as a whole may be equivalent to a low-temperature polysilicon transistor after being turned on at a subsequent stage, to rapidly write the data voltage into the drive module 10. Although the second transistor T2 is an oxide transistor, the second transistor T2 is completely turned on at the subsequent data voltage writing stage, without affecting rapid writing of the data voltage.

At the data voltage writing stage, the light-emitting control module 14, the compensation module 15, and the first initialization module 161 are controlled to be turned off, and the first transistor T1, the second transistor T2, and the second initialization module 162 are controlled to be turned on, and the data voltage Vd is written into the first terminal of the first storage module 111 via the first transistor T1 and the second transistor T2 that are turned on. The voltage at the second terminal of the drive module 10 is maintained at the second initialization voltage Vf2 of the previous stage. The first transistor T1 is a low-temperature polysilicon transistor with a high mobility, and can rapidly write the data voltage Vd into the drive module 10. When a time for the data voltage writing stage is short at a high refresh frequency, the data voltage Vd can still be fully written into the drive module 10, to help improve a display effect under high-frequency driving.

At the light emitting stage, the compensation module 15, the first initialization module 161, the second initialization module 162, the first transistor T1, and the second transistor T2 are controlled to be turned off, the light-emitting control module 14 is controlled to be turned on, and the drive module 10 generates a driving current based on a voltage between the control terminal and the second terminal thereof to drive the light-emitting module 13 to emit light. The second transistor T2 is an oxide transistor that has a small leakage current in an off state at the light emitting stage, to ensure stability of a voltage at the control terminal of the drive module 10 when the light emitting stage is long at a low refresh frequency, and helping improve a display effect under low-frequency driving.

In conclusion, the pixel circuit helps implement broadband display.

In another embodiment, in one embodiment, the compensation module 15 is connected in parallel to the first storage module 111. For connection relationships of other modules, still refer to FIG. 5. When the compensation module 15 is connected in parallel to the first storage module 111, the control terminal of the drive module 10 is initialized by the first initialization voltage Vf1. Other processes are the same as those of the pixel circuit shown in FIG. 5. Details are not described in this embodiment again.

Figure 6:
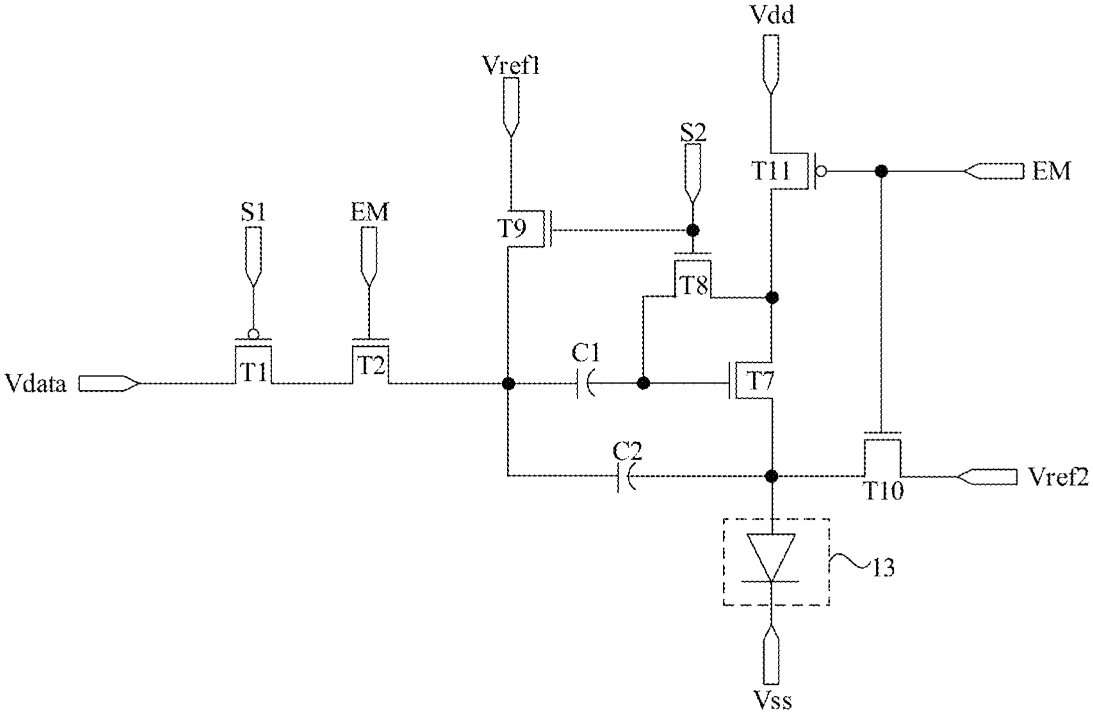
FIG. 6 is a schematic diagram of a structure of another pixel circuit according to an embodiment of the present application.

FIG. 6 is a schematic diagram of a structure of another pixel circuit according to an embodiment of the present application. Referring to FIGS. 5 and 6, in one embodiment, the drive module 10 includes a seventh transistor T7; the compensation module 15 includes an eighth transistor T8; the first initialization module 161 includes a ninth transistor T9; the second initialization module 162 includes a tenth transistor T10; and the light-emitting control module 14 includes an eleventh transistor T11. The first storage module 111 includes a first capacitor C1, and the second storage module 112 includes a second capacitor C2.

A first electrode of the first transistor T1 is connected to the data line Vdata, a second electrode of the first transistor T1 is connected to a first electrode of the second transistor T2, a second electrode of the second transistor T2 is connected to a first terminal of the first capacitor C1, a gate of the first transistor T1 is connected to a first scan line S1, and a gate of the second transistor T2 is connected to a light-emitting control signal line EM.

A first electrode of the ninth transistor T9 is connected to a first initialization signal line Vref1, a second electrode of the ninth transistor T9 is connected to the first terminal of the first capacitor C1, a gate of the ninth transistor T9 is connected to a second scan line S2, and a second terminal of the first capacitor C1 is electrically connected to a gate of the seventh transistor T7.

A first electrode of the eighth transistor T8 is connected to a first electrode of the seventh transistor T7, a second electrode of the eighth transistor T8 is connected to the gate of the seventh transistor T7, and a gate of the eighth transistor T8 is connected to the second scan line S2.

A first terminal of the second capacitor C2 is connected to the first terminal of the first capacitor C1, and a second terminal of the second capacitor C2 is connected to a second electrode of the seventh transistor T7.

A first electrode of the tenth transistor T10 is connected to a second initialization signal line Vref2, a second electrode of the tenth transistor T10 is connected to the second electrode of the seventh transistor T7, and a gate of the tenth transistor T10 is connected to the light-emitting control signal line EM.

A first electrode of the eleventh transistor T11 is connected to a first power supply Vdd, a second electrode of the eleventh transistor T11 is connected to the first electrode of the seventh transistor T7, and a gate of the eleventh transistor T11 is connected to the light-emitting control signal line EM.

In one embodiment, the eleventh transistor T11 is a low-temperature polysilicon transistor, and the seventh transistor T7, the eighth transistor T8, the ninth transistor T9, and the tenth transistor T10 are all oxide transistors.

Figure 7:
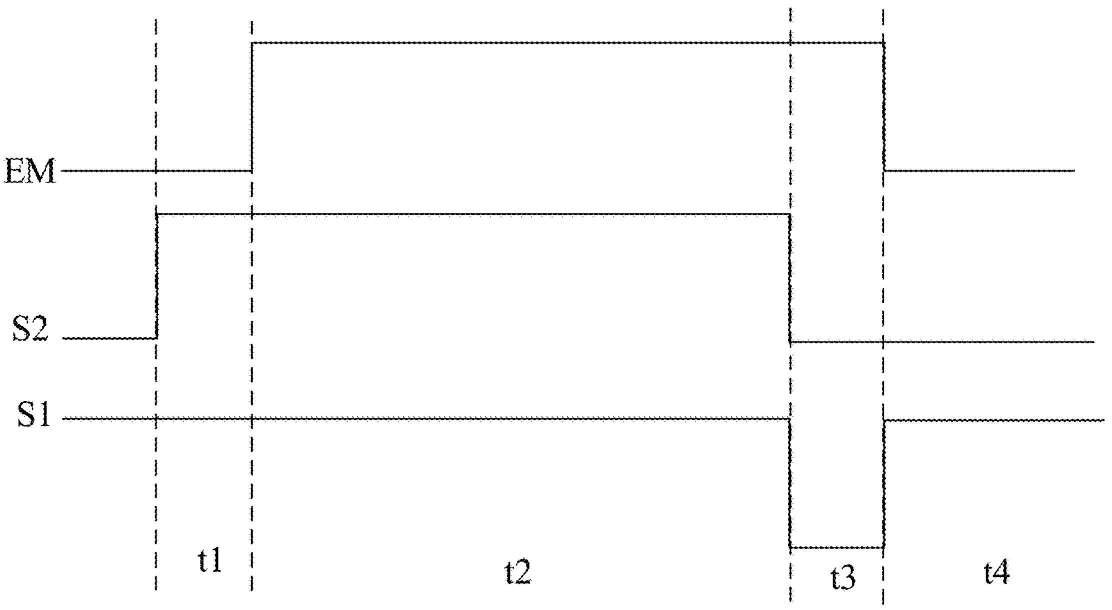
FIG. 7 is a diagram showing driving timing of another pixel circuit according to an embodiment of the present application.

FIG. 7 is a diagram showing driving timing of another pixel circuit according to an embodiment of the present application. The driving timing shown in FIG. 7 is applicable to the pixel circuit shown in FIG. 6. In one embodiment, the first transistor T1 and the eleventh transistor T11 are P-type transistors. The second transistor T2, the seventh transistor T7, the eighth transistor T8, the ninth transistor T9, and the tenth transistor T10 are all N-type transistors. Referring to FIGS. 6 and 7, a working process of the pixel circuit provided in this embodiment includes an initialization stage t1, a compensation stage t2, a data voltage writing stage t3, and a light emitting stage t4.

At the initialization stage t1, a signal on the first scan line S1 is at a high level, and the first transistor T1 is controlled to be turned off. A signal on the second scan line S2 is at a high level, and the eighth transistor T8 and the ninth transistor T9 are controlled to be turned on. A signal on the light-emitting control signal line EM is at a low level, the second transistor T2 and the tenth transistor T10 are controlled to be turned off, and the eleventh transistor T11 is controlled to be turned on. A first initialization voltage Vf1 provided by the first initialization signal line Vref1 is transmitted to the first terminals of the first capacitor C1 and the second capacitor C2 via the ninth transistor T9 that is turned on. A first power voltage V1 provided by the first power supply Vdd is transmitted to the first electrode and the gate of the seventh transistor T7 via the eleventh transistor T11 and the eighth transistor T8 that are turned on. After the first power voltage V1 is transmitted to the gate of the seventh transistor T7, the seventh transistor T7 is turned on, and a current flows through the light-emitting module 13. However, the light-emitting module 13 emits light for an extremely short time at this stage. Therefore, a contrast is not affected even if the light-emitting module 13 emits light.

At the compensation stage t2, the signal on the first scan line S1 is at a high level, and the first transistor T1 is controlled to be turned off. The signal on the second scan line S2 is at a high level, and the eighth transistor T8 and the ninth transistor T9 are controlled to be turned on. The signal on the light-emitting control signal line EM is at a high level, the second transistor T2 and the tenth transistor T10 are controlled to be turned on, and the eleventh transistor T11 is controlled to be turned off. A voltage at the first terminal of the first capacitor C1 is maintained at the first initialization voltage Vf1, and a second initialization voltage Vf2 provided by the second initialization signal line Vref2 is transmitted to the second electrode of the seventh transistor T7. A charge of the first electrode of the seventh transistor T7 flows to the second electrode, and a voltage between the first electrode and the gate of the seventh transistor T7 decreases until the voltage decreases to Vf2+Vth, and the seventh transistor T7 is turned off, where Vth is a threshold voltage of the seventh transistor T7. The second transistor T2 is turned on at the compensation stage, and the first transistor T1 and the second transistor T2 as a whole may be equivalent to a low-temperature polysilicon transistor after being turned on at a subsequent stage, to rapidly write the data voltage into the seventh transistor T7. Although the second transistor T2 is an oxide transistor, the second transistor T2 is completely turned on at the subsequent data voltage writing stage t3, without affecting rapid writing of the data voltage.

At the data voltage writing stage t3, the signal on the first scan line S1 is at a low level, and the first transistor T1 is controlled to be turned on. The signal on the second scan line S2 is at a low level, and the eighth transistor T8 and the ninth transistor T9 are controlled to be turned off. The signal on the light-emitting control signal line EM is at a high level, the second transistor T2 and the tenth transistor T10 are controlled to be turned on, and the eleventh transistor T11 is controlled to be turned off. The voltage at the first terminal of the first capacitor C1 changes into the data voltage Vd, that is, a voltage boost amount of the first terminal of the first capacitor C1 is $\Delta 2 = Vd - Vf1$. A voltage at the second terminal of the first capacitor C1 is also boosted by $\Delta 2$ because of a coupling effect of the first capacitor C1. In this case, a voltage at the gate of the seventh transistor T7 is $Vg = Vf2 + Vth + Vd - Vf1$. The second electrode of the seventh transistor T7 is maintained at the second initialization voltage Vf2. The first transistor T1 is a low-temperature polysilicon transistor with a high mobility, and can rapidly write the data voltage Vd into the seventh transistor T7. When a time for the data voltage writing stage t3 is short at a high refresh frequency, the data voltage Vd can still be fully written, to help improve a display effect under high-frequency driving.

At the light emitting stage t4, the signal on the first scan line S1 is at a high level, and the first transistor T1 is controlled to be turned off. The signal on the second scan line S2 is at a low level, and the eighth transistor T8 and the ninth transistor T9 are controlled to be turned off. The signal on the light-emitting control signal line EM is at a low level, the second transistor T2 and the tenth transistor T10 are controlled to be turned off, and the eleventh transistor T11 is controlled to be turned on. The first power voltage V1 is transmitted to the first electrode of the seventh transistor T7 via the eleventh transistor T11 that is turned on, and the seventh transistor T7 generates a driving current based on a voltage between the gate and the second electrode thereof, to drive the light-emitting module 13 to emit light. When the light-emitting module 13 is turned on, a voltage at the second electrode of the seventh transistor T7 is $Vs = V2 + Voled$, where Voled is a cross voltage of the light-emitting module 13. A voltage boost amount of the second terminal of the second capacitor C2 is $\Delta 3 = V2 + Voled - Vf2$. The voltage at the first terminal of the first capacitor C1 is $Vn = Vd + V2 + Voled - Vf2$ because of a coupling effect of the second capacitor C2. Therefore, the voltage at the first terminal of the first capacitor C1 is also boosted, and a boost amount is $\Delta 2 = V2 + Voled - Vf2$. The gate of the seventh transistor T7 is also boosted by $\Delta 2$ because of the coupling effect of the first capacitor C1. In this case, the voltage at the gate of the seventh transistor T7 is $Vg = Vf2 + Vth + Vd - Vf1 + V2 + Voled - Vf2 = Vth + Vd - Vf1 + V2 + Voled$. The driving current is $I = K*(Vgs - Vth)^2 = K[(Vth + Vd - Vf1 + V2 + Voled) - (V2 + Voled) - Vth]^2 = K*(Vd - Vf1)^2$, where $K = \frac{1}{2}*\mu*Cox*W/L$, $\mu$ is a mobility of the seventh transistor T7, Cox is a gate insulator capacitance, and W/L is a width-to-length ratio of the seventh transistor T7. It can be learned from the above equation that the final driving current value is not related to the threshold voltage Vth of the seventh transistor T7, the second power voltage V2, and the cross voltage of the light-emitting module 13, and thus the pixel circuit provided in this embodiment can compensate for problems of an uneven threshold voltage of the seventh transistor T7 and an IR drop of the second power supply Vss, and a problem that light emission is not uniform because cross voltages Voled of different light-emitting modules 13 are different due to aging of the light-emitting modules 13, to help improve the display effect.

The seventh transistor T7 is an oxide transistor with good long-range uniformity, and is suitable for medium to large-sized display with high brightness uniformity. The second transistor T2, the eighth transistor T8, the ninth transistor T9, and the tenth transistor T10 are all oxide transistors that have small leakage currents in the off state, and a retention rate of the voltage at the gate of the seventh transistor T7 is high, to reduce power consumption. The first transistor T1 is a low-temperature polysilicon transistor, and can rapidly write the data voltage into the drive module when a data voltage writing time is short at a high frequency, to improve an effect of high-frequency driving, that is, the pixel circuit in this embodiment can implement broadband driving. The eleventh transistor T11 is a low-temperature polysilicon transistor with good stability under NBTS, and has a small cross voltage, to help reduce power consumption.

Figure 8:
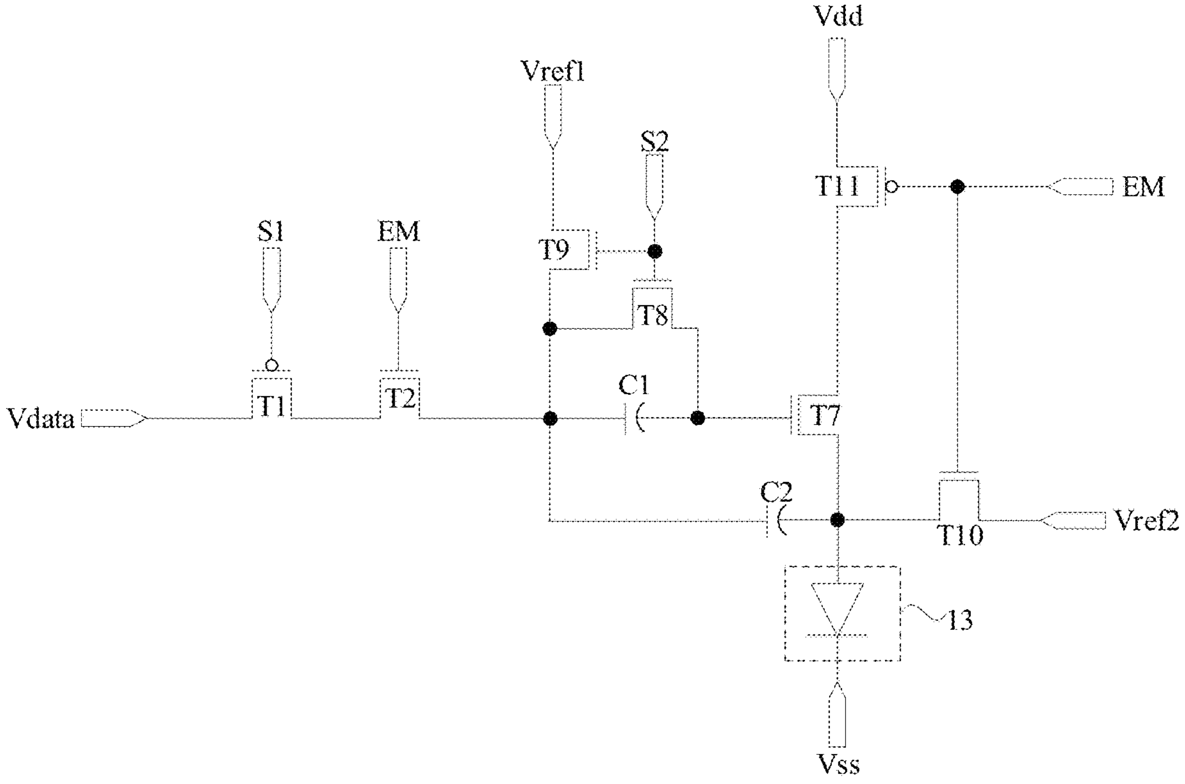
FIG. 8 is a schematic diagram of a structure of another pixel circuit according to an embodiment of the present application.

FIG. 8 is a schematic diagram of a structure of another pixel circuit according to an embodiment of the present application. Referring to FIG. 8, in one embodiment, the first electrode of the eighth transistor T8 is connected to the second electrode of the ninth transistor T9, the second electrode of the eighth transistor T8 is connected to the second terminal of the first capacitor C1, the first terminal of the second capacitor C2 is connected to the first terminal of the first capacitor C1, and the second terminal of the second capacitor C2 is connected to the second electrode of the seventh transistor T7. For connection relationships of other transistors, refer to FIG. 6. Details are not described in this embodiment again. The driving timing shown in FIG. 7 is also applicable to the pixel circuit shown in FIG. 8. An only difference between a working process of the pixel circuit shown in FIG. 8 and the working process of the pixel circuit shown in FIG. 6 lies in that, at the initialization stage t1, the gate of the seventh transistor T7 is initialized by the first initialization voltage Vf1, and at the initialization stage t1, the seventh transistor T7 is not turned on and the light-emitting module 13 does not emit light, to help improve a display effect.

Figure 9:
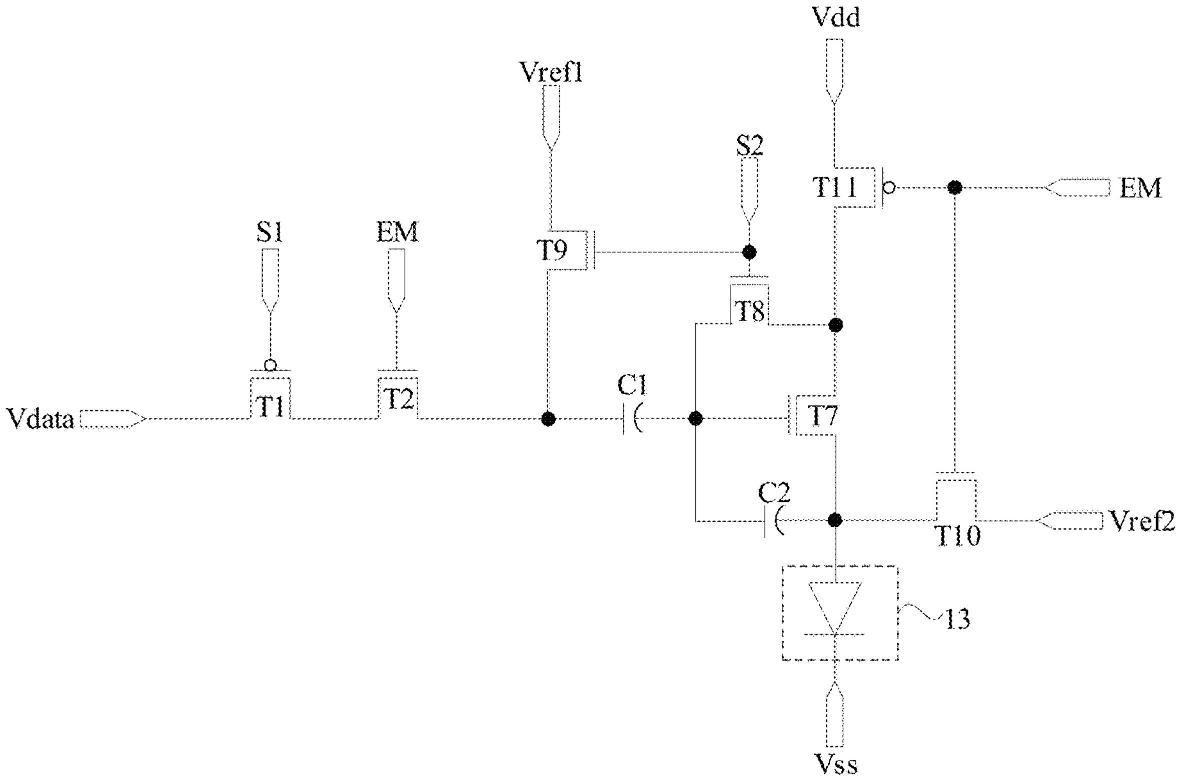
FIG. 9 shows a characteristic curve of a dual-gate transistor according to an embodiment of the present application.

FIG. 9 is a schematic diagram of a structure of another pixel circuit according to an embodiment of the present application. Referring to FIG. 9, in one embodiment, the first electrode of the eighth transistor T8 is connected to the first electrode of the seventh transistor T7, and the second electrode of the eighth transistor T8 is connected to the gate of the seventh transistor T7. The first terminal of the second capacitor C2 is connected to the gate of the seventh transistor T7, and the second terminal of the second capacitor C2 is connected to the second electrode of the seventh transistor T7. Connection relationships of other transistors are the same as those in FIG. 6. Details are not described herein again. The driving timing shown in FIG. 7 is also applicable to the pixel circuit shown in FIG. 9. An initialization stage t1 and a compensation stage t2 of the pixel circuit shown in FIG. 9 are the same as those of the pixel circuit shown in FIG. 6. For the pixel circuit shown in FIG. 9, at a data voltage writing stage t3, a voltage at the gate of the seventh transistor T7 is $Vg=Vf2+Vth+a(Vd-Vf1)$, where $a=Cs1/(Cs1+Cs2)$, Cs1 is a capacitance of the first capacitor C1, and Cs2 is a capacitance of the second capacitor C2. At a light emitting stage t4, $Vg=Vf2+Vth+a(Vd-Vf1)+V2+Voled-Vf2=Vth+a(Vd-Vf1)+V2+Voled$, and a driving current is $I=K(a(Vd-Vf1))^2$.

Figure 10:
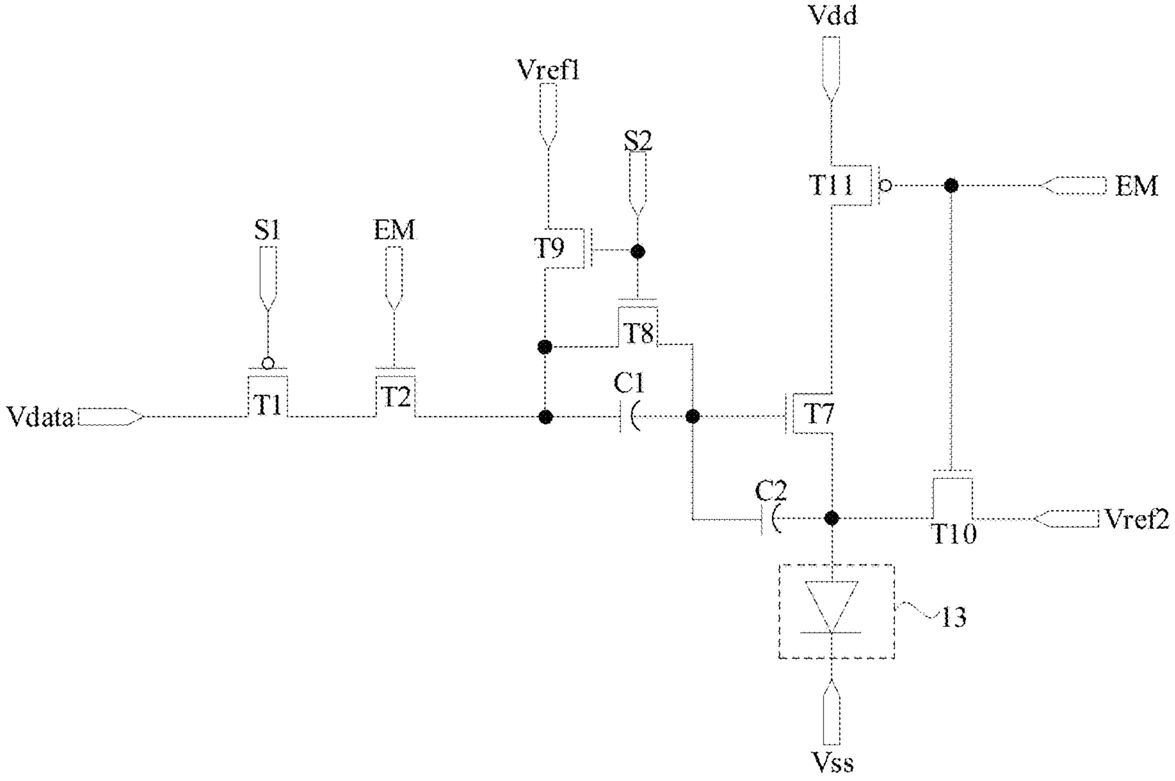
FIG. 10 is a schematic diagram of a structure of another pixel circuit according to an embodiment of the present application.

FIG. 10 is a schematic diagram of a structure of another pixel circuit according to an embodiment of the present application. Referring to FIG. 10, in one embodiment, the first electrode of the eighth transistor T8 is connected to the second electrode of the ninth transistor T9, and the second electrode of the eighth transistor T8 is connected to the second terminal of the first capacitor C1. The first terminal of the second capacitor C2 is connected to the gate of the seventh transistor T7, and the second terminal of the second capacitor C2 is connected to the second electrode of the seventh transistor T7. The driving timing shown in FIG. 7 is also applicable to the pixel circuit shown in FIG. 10. A difference between an initialization stage of the pixel circuit shown in FIG. 10 and the initialization stage of the pixel circuit shown in FIG. 6 lies in that the gate of the seventh transistor T7 is initialized by the first initialization voltage Vf1, and a compensation stage t2 is the same as that shown in FIG. 6. For the pixel circuit shown in FIG. 10, at a data voltage writing stage t3, a voltage at the gate of the seventh transistor T7 is $Vg=Vf2+Vth+a(Vd-Vf1)$, where $a=Cs1/(Cs1+Cs2)$, Cs1 is a capacitance of the first capacitor C1, and Cs2 is a capacitance of the second capacitor C2. At a light emitting stage t4, $Vg=Vf2+Vth+a(Vd-Vf1)+V2+Voled-Vf2=Vth+a(Vd-Vf1)+V2+Voled$, and a driving current is $I=K(a(Vd-Vf1))^2$.

Figure 11:
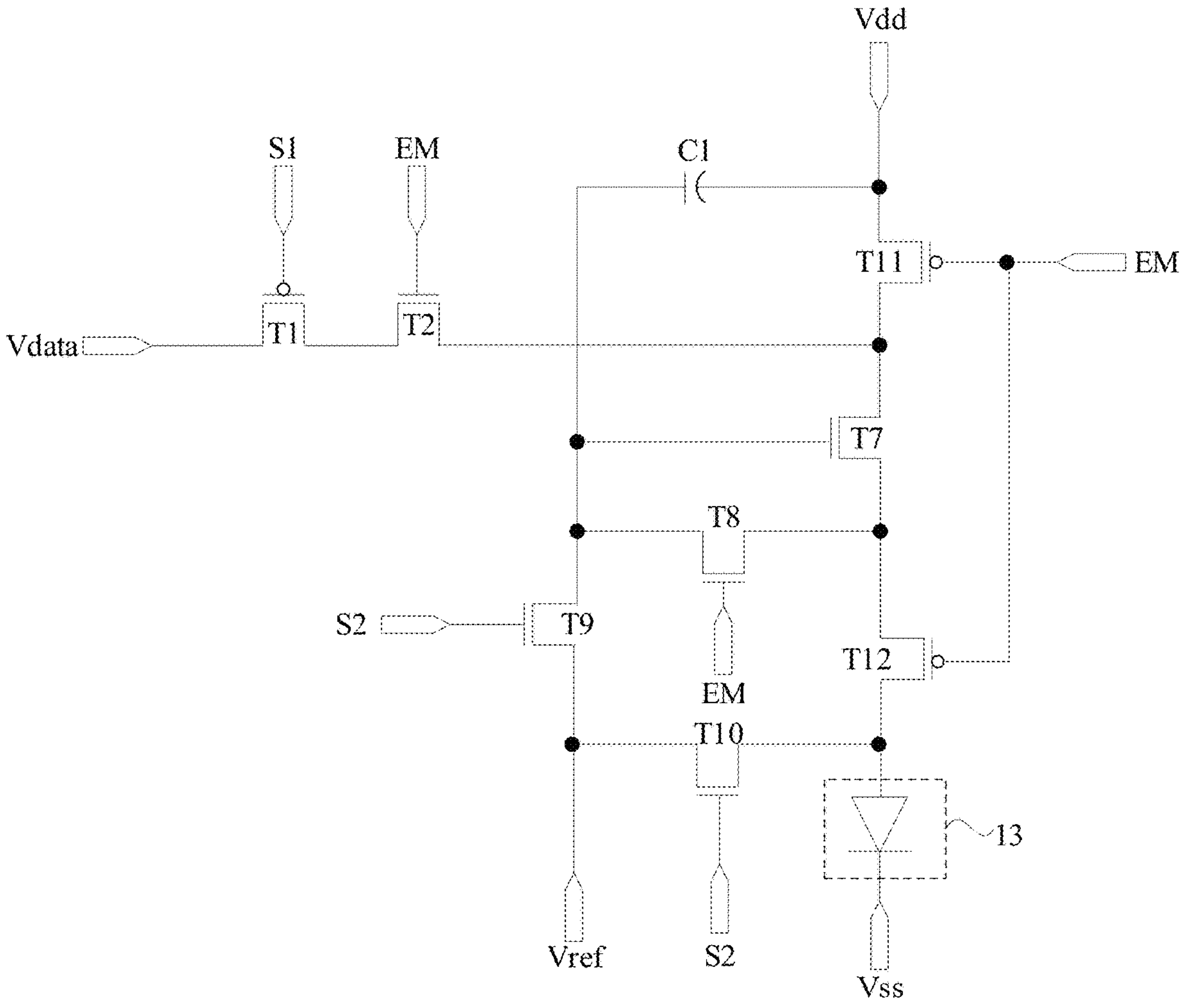
FIG. 11 is a schematic diagram of a structure of another pixel circuit according to an embodiment of the present application.
Figure 12:
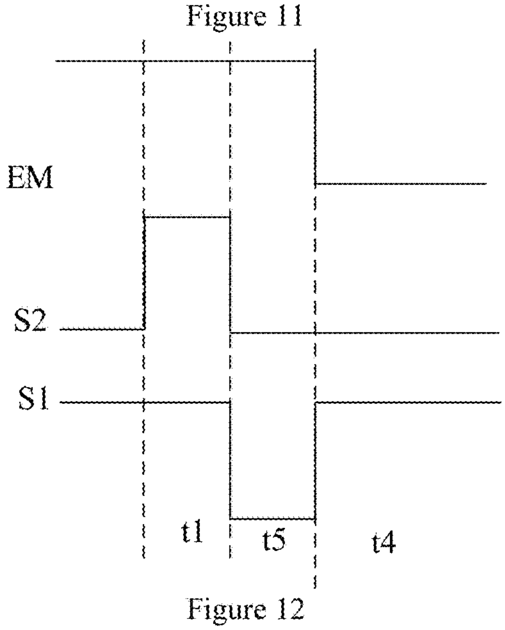
FIG. 12 is a diagram showing driving timing of another pixel circuit according to an embodiment of the present application.

FIG. 11 is a schematic diagram of a structure of another pixel circuit according to an embodiment of the present application. Referring to FIG. 11, in one embodiment, the pixel circuit further includes a storage module, a light-emitting control module, a compensation module, and an initialization module. The light-emitting control module includes an eleventh transistor T11 and a twelfth transistor T12. The drive module includes a seventh transistor T7. The compensation module includes an eighth transistor T8. The initialization module includes a ninth transistor T9 and a tenth transistor T10. The storage module includes a first capacitor C1. A first electrode of the eleventh transistor T11 is connected to a first power supply Vdd, a second electrode of the eleventh transistor T11 is connected to a first electrode of the seventh transistor T7, a second electrode of the seventh transistor T7 is connected to a first electrode of the twelfth transistor T12, a second electrode of the twelfth transistor T12 is connected to a first terminal of the light-emitting module 13, and a second terminal of the light-emitting module 13 is connected to a second power supply Vss. Gates of the eleventh transistor T11 and the twelfth transistor T12 are connected to a light-emitting control signal line EM. A first electrode of the eighth transistor T8 is connected to the second electrode of the seventh transistor T7, a second electrode of the eighth transistor T8 is connected to a gate of the seventh transistor T7, and a gate of the eighth transistor T8 is connected to the light-emitting control signal line EM. A first electrode of the ninth transistor T9 is connected to an initialization signal line Vref, a second electrode of the ninth transistor T9 is connected to the gate of the seventh transistor T7, a first electrode of the tenth transistor T10 is connected to the initialization signal line Vref, a second electrode of the tenth transistor T10 is connected to the first terminal of the light-emitting module 13, and gates of the ninth transistor T9 and the tenth transistor T10 are connected to a second scan line S2. The first transistor T1 and the second transistor T2 are sequentially connected in series between the data line Vdata and the first electrode of the seventh transistor T7. A gate of the first transistor T1 is connected to a first scan line S1, and a gate of the second transistor T2 is connected to the light-emitting control signal line EM. A first terminal of the first capacitor C1 is connected to the first power supply Vdd, and a second terminal of the first capacitor C1 is connected to the gate of the seventh transistor T7. FIG. 12 is a diagram showing driving timing of another pixel circuit according to an embodiment of the present application, and the driving timing shown in FIG. 12 is applicable to the pixel circuit shown in FIG. 11. In the pixel circuit shown in FIG. 11, for example, the first transistor T1, the eleventh transistor T11, and the twelfth transistor T12 are P-type transistors, and the second transistor T2, the seventh transistor T7, the eighth transistor T8, the ninth transistor T9, and the tenth transistor T10 are N-type transistors. The pixel circuit includes an initialization stage t1, a data voltage writing and compensation stage t5, and a light emitting stage t4.

For example, at the initialization stage t1, the ninth transistor T9 and the tenth transistor T10 are turned on in response to a high level on the second scan line S2, the first transistor T1 is turned off in response to a high level on the first scan line S1, the eleventh transistor T11 and the twelfth transistor T12 are turned off in response to a high level on the light-emitting control signal line EM, and the second transistor T2 and the eighth transistor T8 are turned on in response to the high level on the light-emitting control signal line EM. An initialization voltage Vf is transmitted to the gate of the seventh transistor T7 and to the first terminal of the light-emitting module 13, to initialize the drive module and the light-emitting module 13.

At the data voltage writing and compensation stage t5, the ninth transistor T9 and the tenth transistor T10 are turned off in response to a low level on the second scan line S2, the first transistor T1 is turned on in response to a low level on the first scan line S1, the eleventh transistor T11 and the twelfth transistor T12 are turned off in response to a high level on the light-emitting control signal line EM, and the second transistor T2 and the eighth transistor T8 are turned on in response to the high level on the light-emitting control signal line EM. The data voltage is transmitted to the gate of the seventh transistor T7 via the first transistor T1, the second transistor T2, the seventh transistor T7, and the eighth transistor T8 that are turned on, and the eighth transistor T8 writes information about a threshold voltage of the seventh transistor T7 into the gate of the seventh transistor T7, to complete compensation for the threshold voltage of the seventh transistor T7.

At the light emitting stage t4, the ninth transistor T9 and the tenth transistor T10 are turned off in response to a low level on the second scan line S2, the first transistor T1 is turned off in response to a high level on the first scan line S1, the eleventh transistor T11 and the twelfth transistor T12 are turned on in response to a low level on the light-emitting control signal line EM, and the second transistor T2 and the eighth transistor T8 are turned off in response to the low level on the light-emitting control signal line EM. The seventh transistor T7 generates a driving current based on a voltage between the gate and the second electrode thereof to drive the light-emitting module 13 to emit light.

In an exemplary embodiment, the second transistor T2 is turned on in advance, and the first transistor T1 and the second transistor T2 as a whole may be equivalent to a low-temperature polysilicon transistor after being turned on at a subsequent stage, to rapidly write the data voltage into the drive module (the seventh transistor T7). Although the second transistor T2 is an oxide transistor, the second transistor T2 is completely turned on at the subsequent data voltage writing and compensation stage t5, without affecting rapid writing of the data voltage. Therefore, the second transistor is applicable to high-frequency driving. The first transistor T1 and the second transistor T2 are connected in series, and the first transistor T1 and the second transistor T2 as a whole are equivalent to an oxide transistor after being turned off, to reduce a leakage current. The second transistor T2 is closer to the seventh transistor T7 than the first transistor T1, and the second transistor T2 has a stronger capability of suppressing leakage after being turned off, which helps maintain stability of a voltage at the gate of the seventh transistor T7. In addition, the second transistor T2 is also connected in series to the first transistor T1, and the first transistor T1 may further suppress leakage after being turned off, to improve stability of the voltage at the gate of the seventh transistor T7 and improving display uniformity. Therefore, a pixel drive circuit in which a low-temperature polysilicon transistor is combined with an oxide transistor is used, and display stability of a display panel can be ensured at both a low refresh frequency and a high refresh frequency, to help implement broadband driving of the display panel, and reducing power consumption.

Figure 13:
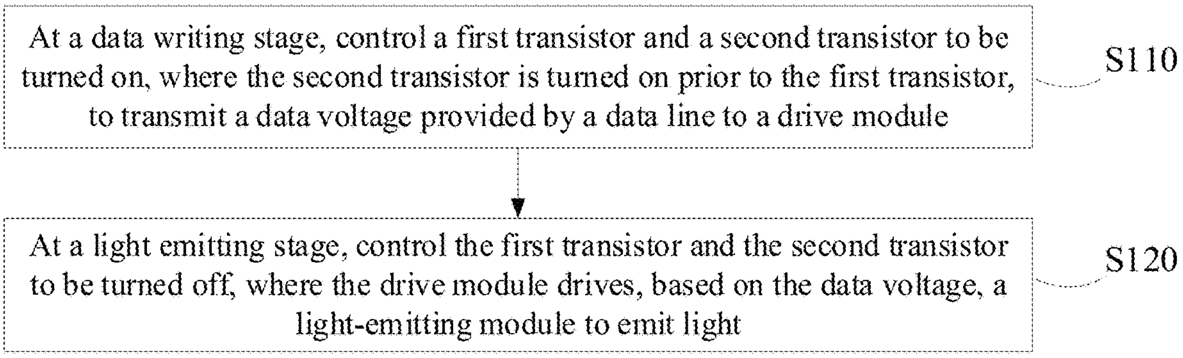
FIG. 13 is a flowchart of a driving method for a pixel circuit according to an embodiment of the present application.

An embodiment of the present application further provides a driving method for a pixel circuit. FIG. 13 is a flowchart of a driving method for a pixel circuit according to an embodiment of the present application. Referring to FIG. 2, the pixel circuit includes a drive module 10, a data writing module 12, and a light-emitting module 13. The data writing module 12 includes a first transistor T1 and a second transistor T2 that are connected in series, the first transistor T1 is a low-temperature polysilicon transistor, and the second transistor T2 is an oxide transistor.

Referring to FIGS. 2 and 13, the driving method includes the following steps.

S110: At a data writing stage, control the first transistor and the second transistor to be turned on, where the second transistor is turned on prior to the first transistor, to transmit a data voltage provided by a data line to the drive module.

The second transistor T2 may be turned on before a data voltage writing stage, not to affect writing of the data voltage at the data voltage writing stage. The low-temperature polysilicon transistor has a high mobility and a high driving speed. The first transistor T1, being a low-temperature polysilicon transistor, may rapidly write the data voltage into the drive module, and is applicable to high-frequency driving. A leakage current of the oxide transistor in an off state is small. The second transistor T2, being an oxide transistor, may reduce the leakage current, to alleviate a problem of a poor display effect at a low refresh frequency, and ensuring display stability of a display panel. Therefore, in this embodiment, a pixel drive circuit in which a low-temperature polysilicon transistor is combined with an oxide transistor is used, and display stability of the display panel can be ensured at both the low refresh frequency and a high refresh frequency, to facilitate broadband driving of the display panel, and reducing power consumption.

S120: At a light emitting stage, control the first transistor and the second transistor to be turned off. The drive module drives, based on the data voltage, the light-emitting module to emit light.

The drive module 10 generates a driving current based on the data voltage, and the drive module 10 drives the light-emitting module 13 to emit light at the light emitting stage.

In one embodiment, still referring to FIG. 2, the pixel circuit further includes a storage module 11, a light-emitting control module 14, and an initialization module. The initialization module includes a first initialization module 161, a second initialization module 162, and a third initialization module 163. The storage module 11 is connected to the drive module 10, and the storage module 11 includes a first storage module 111 and a second storage module 112. The drive module 10 includes a dual-gate transistor T0. The light-emitting control module 14, the dual-gate transistor T0, and the light-emitting module 13 are sequentially connected between a first power supply Vdd and a second power supply Vss. A first electrode D of the dual-gate transistor T0 is connected to the light-emitting control module, and a second electrode S of the dual-gate transistor T0 is connected to the light-emitting module 13. The data writing module 12 is connected between a first gate G of the dual-gate transistor T0 and the data line Vdata. The first storage module 111 is connected between the first gate G and the second electrode S of the dual-gate transistor T0, and the second storage module 112 is connected between a second gate B and the second electrode S of the dual-gate transistor T0. The first initialization module 161 is connected between the first gate G and the second electrode S of the dual-gate transistor T0, and the second initialization module 162 is connected between the second gate B and the first electrode D of the dual-gate transistor T0. The third initialization module 163 is connected between the second electrode S of the dual-gate transistor T0 and an initialization signal line Vref. Referring to FIG. 2, the driving method further includes the following content.

At an initialization stage, the third initialization module 163, the light-emitting control module 14, the second transistor T2, the first initialization module 161, and the second initialization module 162 are controlled to be turned on, and the first transistor T1 is controlled to be turned off, to transmit a first power voltage provided by the first power supply Vdd to the second gate B and the first electrode D of the dual-gate transistor T0, and transmit an initialization voltage provided by the initialization signal line Vref or a second power voltage to the second electrode S and the first gate G of the dual-gate transistor T0, to initialize the first gate G, the second gate B, the first electrode D, and the second electrode S of the dual-gate transistor T0, where the second power voltage is a voltage provided by the second power supply Vss.

The second transistor T2 is turned on prior to the first transistor T1, not to affect rapid writing of the data voltage at the subsequent data voltage writing stage.

At a compensation stage, the light-emitting control module 14 is controlled to be turned off, the third initialization module 163, the second transistor T2, the first initialization module 161, and the second initialization module 162 are controlled to be turned on, and a path is formed among the second initialization module 162, the dual-gate transistor T0, the third initialization module 163, and the initialization signal line Vref, to complete compensation for a threshold voltage of the dual-gate transistor T0.

At the compensation stage, the first power voltage V1 is higher than the initialization voltage Vf. Therefore, a path is formed among the second gate B, the second initialization module 162, the dual-gate transistor T0, the third initialization module 163, and the initialization signal line Vref. A charge of the second gate B flows to the second electrode S, and a voltage between the second gate B and the first electrode D decreases. As a voltage at the second gate B decreases, the threshold voltage Vth of the dual-gate transistor T0 gradually positively shifts. When the threshold voltage Vth is equal to 0 V, a voltage difference between the first gate G and the second electrode S of the dual-gate transistor T0 is VGS=Vth=0, the dual-gate transistor T0 is turned off, and the second storage module 112 stores the voltage difference VBS between the second gate B and the second electrode of the dual-gate transistor T0.

At the data voltage writing stage, the first transistor T1, the second transistor T2, and the third initialization module 163 are controlled to be turned on, and the first initialization module 161, the second initialization module 162, and the light-emitting control module EM are controlled to be turned off, to transmit the data voltage provided by the data line Vdata to the drive module 10.

The data voltage Vd provided by the data line Vdata is transmitted to the first gate G of the dual-gate transistor T0 via the first transistor T1 and the second transistor T2 that are turned on, a voltage at the second electrode S of the dual-gate transistor T0 is maintained at the initialization voltage Vf. In this case, the voltage difference between the second gate B and the second electrode of the dual-gate transistor T0 remains unchanged, and the threshold voltage Vth of the dual-gate transistor T0 remains unchanged.

At the light emitting stage, the first transistor T1, the second transistor T2, the first initialization module 161, the second initialization module 162, and the third initialization module 163 are controlled to be turned off, the light-emitting control module EM is controlled to be turned on, and the dual-gate transistor T0 generates a driving current based on the data voltage Vd to drive the light-emitting module 13 to emit light.

At the light emitting stage, the voltage difference between the second gate B and the second electrode S of the dual-gate transistor T0 remains unchanged, and the threshold voltage Vth=0 of the dual-gate transistor T0 remains unchanged. A path is formed among the first power supply Vdd, the light-emitting control module 14, the dual-gate transistor T0, the light-emitting module 13, and the second power supply Vss. The dual-gate transistor T0 generates the driving current to drive the light-emitting module 13 to emit light.

In one embodiment, referring to FIG. 5, the pixel circuit further includes a storage module 11, a light-emitting control module 14, a compensation module 15, and an initialization module. The storage module 11 is connected to the drive module 10. The storage module 11 includes a first storage module 111 and a second storage module 112. The light-emitting control module 14, the drive module 10, and the light-emitting module 13 are sequentially connected between a first power supply Vdd and a second power supply Vss. The first storage module 111 is connected between the data writing module 12 and a control terminal of the drive module 10. The compensation module 15 is connected in parallel to the first storage module 111 or the compensation module 15 is connected between the control terminal and a first terminal of the drive module 10, and the first terminal of the drive module 10 is connected to the light-emitting control module 14. The second storage module 112 is connected between the data writing module 12 and a second terminal of the drive module 10, or the second storage module 112 is connected between the first storage module 111 and a second terminal of the drive module 10. The initialization module includes a first initialization module 161 and a second initialization module 162. The first initialization module 161 is connected between a first initialization signal line Vref1 and a first terminal of the first storage module 111, and a second terminal of the first storage module 111 is connected to the control terminal of the drive module 10. The second initialization module 162 is connected between a second initialization signal line Vref2 and the second terminal of the drive module 10. The driving method further includes the following content.

At an initialization stage, the first transistor T1, the second transistor T2, and the second initialization module 162 are controlled to be turned off, and the compensation module 15, the first initialization module 161, and the light-emitting control module 14 are controlled to be turned on, to transmit a first power voltage provided by the first power supply Vdd between the first terminal and the control terminal of the drive module 10, and transmit a first initialization voltage on the first initialization signal line Vref1 to the first storage module 111, to initialize the control terminal and the first terminal of the drive module 10 and the first storage module 111.

The first power voltage V1 provided by the first power supply Vdd is transmitted to the control terminal and the first terminal of the drive module 10 via the light-emitting control module 14 and the compensation module 15, to initialize the same. A second initialization voltage Vf2 provided by the second initialization signal line Vref2 is transmitted to the second terminal of the drive module 10 via the second initialization module 162 that is turned on, to initialize the second terminal of the drive module 10.

At a compensation stage, the first transistor T1 and the light-emitting control module 14 are controlled to be turned off, and the compensation module 15, the second transistor T2, the first initialization module 161, and the second initialization module 162 are controlled to be turned on, to compensate the drive module 10 for a threshold voltage.

The first terminal of the drive module 10 charges the second terminal of the drive module 10, and a voltage at the first terminal of the drive module 10 decreases until a voltage between the first terminal and the control terminal of the drive module 10 decreases to Vf2+Vth, and the drive module 10 is turned off, where Vth is the threshold voltage of the drive module 10. At the compensation stage, the second transistor T2 is turned on in advance for subsequent writing of the data voltage Vd.

At the data voltage writing stage, the compensation module 15, the first initialization module 161, and the light-emitting control module 14 are controlled to be turned off, and the first transistor T1, the second transistor T2, and the second initialization module 162 are controlled to be turned on, to transmit the data voltage provided by the data line Vdata to the drive module 10.

The data voltage Vd is written into the first terminal of the first storage module 111 via the first transistor T1 and the second initialization module 162 that are turned on. The voltage at the second terminal of the drive module 10 is maintained at the second initialization voltage Vf2 of the previous stage. The first transistor T1 and the second transistor T2 as a whole may be equivalent to a low-temperature polysilicon transistor at the data voltage writing stage, to rapidly write the data voltage into the drive module 10. Although the second transistor T2 is an oxide transistor, the second transistor T2 is completely turned on at the data voltage writing stage, without affecting rapid writing of the data voltage. When a time for the data voltage writing stage is short at a high refresh frequency, the data voltage Vd can still be fully written into the drive module 10, to help improve a display effect under high-frequency driving.

At the light emitting stage, the first transistor T1, the second transistor T2, the first initialization module 161, the second initialization module 162, and the compensation module 15 are controlled to be turned off, and the light-emitting control module 14 is controlled to be turned on. The drive module 10 generates a driving current based on the data voltage Vd to drive the light-emitting module 13 to emit light.

The drive module 10 generates, based on a voltage between the control terminal and the second terminal of the drive module 10, the driving current to drive the light-emitting module 13 to emit light. The second transistor T2 is an oxide transistor that has a small leakage current in an off state at the light emitting stage, to ensure stability of a voltage at the control terminal of the drive module 10 when the light emitting stage is long at a low refresh frequency, and helping improve a display effect.

Figure 14:
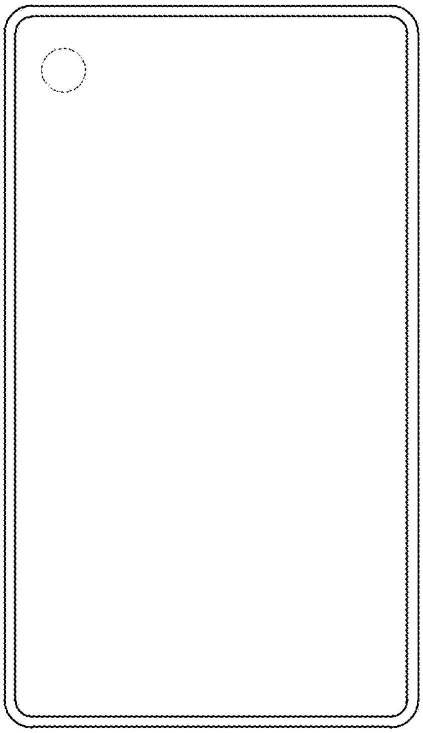
FIG. 14 is a schematic diagram of a structure of a display panel according to an embodiment of the present application.

An embodiment of the present application further provides a display panel. The display panel includes the pixel circuit provided in any embodiment of the present application. FIG. 14 is a schematic diagram of a structure of a display panel according to an embodiment of the present application. Referring to FIG. 14, the display panel may be a panel of a mobile phone shown in FIG. 14, or may be a panel of any electronic product with a display function, including but not limited to the following categories: a TV set, a notebook computer, a desktop monitor, a tablet computer, a digital camera, a smart bracelet, smart glasses, a vehicle-mounted display, a medical apparatus, an industrial control apparatus, a touch interaction terminal, etc., which is not specifically limited in the embodiments of the present application.

What is claimed is:

1. A pixel circuit, comprising:

a drive module, a data writing module, and a light-emitting module, wherein the data writing module comprises a first transistor and a second transistor that are connected in series, the first transistor is a low-temperature polysilicon transistor, the second transistor is an oxide transistor, and the data writing module is configured to transmit a data voltage to the drive module;

the drive module is configured to drive, based on the data voltage, the light-emitting module to emit light;

a storage module, a light-emitting control module, a compensation module, and an initialization module, wherein the storage module is connected to the drive module, and the storage module is configured to store the data voltage; the storage module comprises a first storage module and a second storage module; the light-emitting control module, the drive module, and the light-emitting module are sequentially connected between a first power supply and a second power supply;

the first storage module is connected between the data writing module and a control terminal of the drive module, and the first storage module is configured to couple the data voltage to the drive module;

the compensation module is connected in parallel to the first storage module, and a first terminal of the drive module is connected to the light-emitting control module, or the compensation module is connected between die control terminal and a first terminal of the drive module, and the first terminal of the drive module is connected to the light-emitting control module;

the second storage module is connected between the data writing module and a second terminal of the drive module or the second storage module is connected between the first storage module and a second terminal of the drive module, and the second storage module is configured to couple a voltage at the second terminal of the drive module to the first storage module; and the initialization module is configured to initialize the first storage module and the second storage module, wherein the initialization module comprises a first initialization module and a second initialization module, the first initialization module is connected between a first initialization signal line and a first terminal of the first storage module, and a second terminal of the first storage module is connected to the control terminal of the drive module;

the second initialization module is connected between a second initialization signal line and the second terminal of the drive module, wherein the drive module comprises a seventh transistor, the compensation module comprises an eighth transistor, the first initialization module comprises a ninth transistor, the second initialization module comprises a tenth transistor, and the light-emitting control module comprises an eleventh transistor; the first storage module comprises a first capacitor, and the second storage module comprises a second capacitor;

a first electrode of the first transistor is connected to the data line a second electrode of the first transistor is connected to a first electrode of the second transistor, a second electrode of the second transistor is connected to a first terminal of the first capacitor, a gate of the first transistor is connected to a first scan line, and a gate of the second transistor is connected to a light-emitting control signal line;

a first electrode of the ninth transistor is connected to the first initialization signal line, a second electrode of the ninth transistor is connected to the first terminal of the first capacitor, a gate of the ninth transistor is connected to a second scan line, and a second terminal of the first capacitor is electrically connected to a gate of the seventh transistor;

a first electrode of the eighth transistor is connected to a first electrode of the seventh transistor, a second electrode of the eighth transistor is connected to the gate of the seventh transistor, and a gate of the eighth transistor is connected to the second scan line; or a first electrode of the eighth transistor is connected to the second electrode of the ninth transistor, a second electrode of the eighth transistor is connected to the second terminal of the first capacitor, and a gate of the eighth transistor is connected to the second scan line;

a first terminal of the second capacitor is connected to die first terminal of the first capacitor, and a second terminal of the second capacitor is connected to a second electrode of the seventh transistor, or a first terminal of the second capacitor is connected to the gate of the seventh transistor, and a second terminal of the second capacitor is connected to a second electrode of the seventh transistor;

a first electrode of the tenth transistor is connected to the second initialization signal line, a second electrode of the tenth transistor is connected to the second electrode of the seventh transistor, and a gate of the tenth transistor is connected to the light-emitting control signal line; and a first electrode of the eleventh transistor is connected to the first power supply, a second electrode of the eleventh transistor is connected to the first electrode of the seventh transistor and a gate of the eleventh transistor is connected to the light-emitting control signal line.

2. The pixel circuit according to claim 1, wherein in a display period of the pixel circuit, the second transistor is turned on prior to the first transistor, and the first transistor is turned on in a period in which the second transistor is turned on.

3. The pixel circuit according to claim 1, wherein the first transistor and the second transistor are sequentially connected in series between a data line and the drive module.

4. The pixel circuit according to claim 1, wherein the eleventh transistor is a low-temperature polysilicon transistor, and the seventh transistor, the eighth transistor, the ninth transistor, and the tenth transistor are all oxide transistors.

5. A driving method for a pixel circuit, wherein the pixel circuit comprises a drive module, a data writing module, and a light-emitting module; the data writing module comprises a first transistor and a second transistor that are connected in series, the first transistor is a low-temperature polysilicon transistor, and the second transistor is an oxide transistor; and the driving method comprises:

at a data writing stage, controlling the first transistor and the second transistor to be turned on, wherein the second transistor is turned on prior to the first transistor, to transmit a data voltage provided by a data line to the drive module;

at a light emitting stage, controlling the first transistor and the second transistor to be turned off, and driving, by the drive module based on the data voltage, the light-emitting module to emit light, wherein the pixel circuit further comprises a storage module, a light-emitting control module, and an initialization module; the storage module is connected to the drive module; the initialization module comprises a first initialization module, a second initialization module, and a third initialization module the storage module comprises a first storage module and a second storage module; the drive module comprises a dual-gate transistor, the light-emitting control module the dual-gate transistor, and the light-emitting module are sequentially connected between a first power supply and a second power supply, a first electrode of the dual-gate transistor is connected to the light-emitting control module and a second electrode of the dual-gate transistor is connected to the light-emitting module, the data writing module is connected between a first gate of the dual-gate transistor and the data line, the first storage module is connected between the first gate and the second electrode of the dual-gate transistor, and the second storage module is connected between a second gate and the second electrode of the dual-gate transistor, the first initialization module is connected between the first gate and the second electrode of the dual-gate transistor, and the second initialization module is connected between the first gate and the first electrode of the dual-gate transistor, and the third initialization module is connected between the second electrode of the dual-gate transistor and an initialization signal line; and the driving method comprises:

at an initialization stage, controlling the third initialization module, the light-emitting control module, the second transistor, the first initialization module, and the second initialization module to be turned on, and controlling the first transistor to be turned off to transmit a first power voltage provided by the first power supply to the second gate and the first electrode of the dual-gate transistor, and transmit an initialization voltage provided by the initialization signal line or a second power voltage to the second electrode and the first gate of the dual-gate transistor to initialize the first gate, the second gate, the first electrode, and the second electrode of the dual-gate transistor, wherein the second power voltage is a voltage provided by the second power supply;

at a compensation stage, controlling the light-emitting control module to be turned off, controlling the third initialization module, the second transistor, the first initialization module, and the second initialization module to be turned on, and forming a path among the second initialization module, the dual-gate transistor, the third initialization module, and the initialization signal line, to complete compensation for a threshold voltage of the dual-gate transistor;

at the data writing stage, controlling the first transistor, the second transistor, and the third initialization module to be turned on, and controlling the first initialization module, the second initialization module and the light-emitting control module to be turned off, to transmit the data voltage provided by the data line to the drive module; and at the light emitting stage, controlling the first transistor, the second transistor, the first initialization module, the second initialization module, and the third initialization module to be turned off, and controlling the light-emitting control module to be turned on, and the dual-gate transistor generates a driving current based on the data voltage to drive the light-emitting module to emit light wherein the pixel circuit further comprises a storage module, a light-emitting control module, a compensation module, and an initialization module, and the storage module is connected to the drive module; the storage module comprises a first storage module and a second storage module; the light-emitting control module, the drive module, and the light-emitting module are sequentially connected between a first power supply and a second power supply, the data writing module is connected between the first storage module and the data line; the first storage module is connected between the data writing module and a control terminal of the drive module; the compensation module is connected in parallel to the first storage module, and a first terminal of the drive module is connected to the light-emitting control module or the compensation module is connected between the control terminal and a first terminal of the drive module, and the first terminal of the drive module is connected to the light-emitting control module; the second storage module is connected between the data writing module and a second terminal of the drive module or the second storage module is connected between the first storage module and a second terminal of the drive module, the initialization module comprises a first initialization module and a second initialization module, the first initialization module is connected between a first initialization signal line and a first terminal of the first storage module, and a second terminal of the first storage module is connected to the control terminal of the drive module, and the second initialization module is connected between a second initialization signal line and the second terminal of the drive module; and the driving method comprises:

at an initialization stage, controlling the first transistor, the second transistor, and the second initialization module to be turned off, and controlling the compensation module, the first initialization module, and the light-emitting control module to be turned on, to transmit a first power voltage provided by the first power supply between the first terminal and the control terminal of the drive module, and transmit a first initialization voltage on the first initialization signal line to the first storage module, to initialize the control terminal and the first terminal of the drive module and the first storage module;

at a compensation stage, controlling the first transistor and the light-emitting control module to be turned off and controlling the compensation module, the second transistor, the first initialization module, and the second initialization module to be turned on, to compensate the drive module for a threshold voltage;

at a data voltage writing state, controlling the compensation module, the first initialization module, and the light-emitting control module to be turned off, and controlling the first transistor, the second transistor, and the second initialization module to be turned on, to transmit the data voltage provided by the data line to the drive module; and at a light emitting stage, controlling the first transistor, the second transistor, the first initialization module, the second initialization module, and the compensation module to be turned off and controlling the light-emitting control module to be turned on; and generating, by the drive module, a driving current based on the data voltage to drive the light-emitting module to emit light.

6. A display panel, comprising:

a pixel circuit, comprising:

a drive module, a data writing module, and a light-emitting module, wherein the data writing module comprises a first transistor and a second transistor that are connected in series, the first transistor is a low-temperature polysilicon transistor, the second transistor is an oxide transistor, and the data writing module is configured to transmit a data voltage to the drive module;

the drive module is configured to drive, based on the data voltage, the light-emitting module to emit light;

a storage module, a light-emitting control module, a compensation module, and an initialization module, wherein the storage module is connected to the drive module, and the storage module is configured to store the data voltage; the storage module comprises a first storage module and a second storage module, the light-emitting control module, the drive module, and the light-emitting module are sequentially connected between a first power supply and a second power supply;

the first storage module is connected between the data writing module and a control terminal of the drive module, and the first storage module is configured to couple the data voltage to the drive module;

the compensation module is connected in parallel to the first storage module, and a first terminal of the drive module is connected to the light-emitting control module, or the compensation module is connected between the control terminal and a first terminal of the drive module, and the first terminal of the drive module is connected to the light-emitting control module;

the second storage module is connected between the data writing module and a second terminal of the drive module or the second storage module is connected between the first storage module and a second terminal of the drive module, and the second storage module is configured to couple a voltage at the second terminal of the drive module to the first storage module; and the initialization module is configured to initialize the first storage module and the second storage module, wherein the initialization module comprises a first initialization module and a second initialization module, the first initialization module is connected between a first initialization signal line and a first terminal of the first storage module, and a second terminal of the first storage module is connected to the control terminal of the drive module, the second initialization module is connected between a second initialization signal line and the second terminal of the drive module, wherein the drive module comprises a seventh transistor, the compensation module comprises an eighth transistor, the first initialization module comprises a ninth transistor, the second initialization module comprises a tenth transistor, and the light-emitting control module comprises an eleventh transistor; the first storage module comprises a first capacitor, and the second storage module comprises a second capacitor;

a first electrode of the first transistor is connected to the data line, a second electrode of the first transistor is connected to a first electrode of the second transistor, a second electrode of the second transistor is connected to a first terminal of the first capacitor, a gate of the first transistor is connected to a first scan line, and a gate of the second transistor is connected to a light-emitting control signal line;

a first electrode of the ninth transistor is connected to the first initialization signal line, a second electrode of the ninth transistor is connected to the first terminal of the first capacitor, a gate of the ninth transistor is connected to a second scan line, and a second terminal of the first capacitor is electrically connected to a gate of the seventh transistor;

a first electrode of the eighth transistor is connected to a first electrode of the seventh transistor, a second electrode of the eighth transistor is connected to the gate of the seventh transistor, and a gate of the eighth transistor is connected to the second scan line; or a first electrode of the eighth transistor is connected to the second electrode of the ninth transistor, a second electrode of eighth transistor is connected to the second terminal of the first capacitor, and a gate of the eighth transistor is connected to the second scan line;

a first terminal of the second capacitor is connected to the first terminal of the first capacitor, and a second terminal of the second capacitor is connected to a second electrode of the seventh transistor, or a first terminal of the second capacitor is connected to the gate of the seventh transistor, and a second terminal of the second capacitor is connected to a second electrode of the seventh transistor;

a first electrode of the tenth transistor is connected to the second initialization signal line, a second electrode of the tenth transistor is connected to the second electrode of the seventh transistor, and a gate of the tenth transistor is connected to the light-emitting control signal line; and a first electrode of the eleventh transistor is connected to the first power supply, a second electrode of the eleventh transistor is connected to the first electrode of the seventh transistor, and a gate of the eleventh transistor is connected to the light-emitting control signal line.

* * * * *